United States Patent
Kalmar-Nagy et al.

(10) Patent No.: US 9,575,486 B2
(45) Date of Patent: Feb. 21, 2017

(54) OSCILLATOR-BASED PATH PLANNING FOR MACHINING OF A POCKET SHAPE IN WORKPIECE

(71) Applicant: Mitsubishi Electric Research Laboratories, Inc., Cambridge, MA (US)

(72) Inventors: Tamas Kalmar-Nagy, Cambridge, MA (US); Huseyin Erdim, Seattle, WA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 357 days.

(21) Appl. No.: 14/225,801

(22) Filed: Mar. 26, 2014

(65) Prior Publication Data

US 2015/0277436 A1    Oct. 1, 2015

(51) Int. Cl.
*G05B 19/4099* (2006.01)
*G05B 19/4093* (2006.01)

(52) U.S. Cl.
CPC ..... *G05B 19/4099* (2013.01); *G05B 19/40937* (2013.01); *G05B 2219/34105* (2013.01); *G05B 2219/34115* (2013.01); *G05B 2219/36214* (2013.01); *G05B 2219/49245* (2013.01); *Y02P 90/265* (2015.11)

(58) Field of Classification Search
None
See application file for complete search history.

(56) References Cited

U.S. PATENT DOCUMENTS

| | | | |
|---|---|---|---|
| 4,577,490 A | 3/1986 | Bray et al. | |
| 5,910,041 A * | 6/1999 | Duescher | B24B 37/042 451/28 |
| 6,396,492 B1 | 5/2002 | Frisken et al. | |
| 6,591,158 B1 * | 7/2003 | Bieterman | G05B 19/41 700/169 |
| 6,724,393 B2 | 4/2004 | Perry et al. | |
| 6,826,024 B2 | 11/2004 | Takeda | |

(Continued)

FOREIGN PATENT DOCUMENTS

| | | |
|---|---|---|
| DE | 19801541 A1 | 7/1998 |
| WO | 2014016397 A1 | 1/2014 |

OTHER PUBLICATIONS

Xu et al. "A mapping-based spiral cutting strategy for pocket machining," Int J Adv Manuf Technology, 2012.

(Continued)

*Primary Examiner* — Tuan Dao
(74) *Attorney, Agent, or Firm* — Gene Vinokur; James McAleenan; Hironori Tsukamoto

(57) ABSTRACT

A method determines a path of a tool machining a pocket shape in a workpiece. The pocket shape is defined by a closed curve in an x-y plane. The method determines positions and velocities of a motion of an oscillator having an energy defined by a function that is positive within a boundary of the pocket shape and equals zero on the boundary of the pocket shape. The method determines coordinates of the path of the tool based on corresponding pairs of position and velocity values of the motion, wherein a position value of each pair represents an x coordinate of the path of the tool in the x-y plane, and a velocity value of each pair represents a y coordinate of the path of the tool in the x-y plane.

13 Claims, 21 Drawing Sheets

(56) References Cited

U.S. PATENT DOCUMENTS

| | | |
|---|---|---|
| 7,042,458 B2 | 5/2006 | Frisken et al. |
| 7,451,013 B2 | 11/2008 | Coleman et al. |
| 7,831,332 B2 | 11/2010 | Diehl |
| 7,877,182 B2 | 1/2011 | Dix et al. |
| 8,295,972 B2 | 10/2012 | Coleman et al. |
| 8,483,858 B2 * | 7/2013 | Sullivan ............ G05B 19/40937 345/420 |
| 2001/0035400 A1 * | 11/2001 | Gartner .................. H01L 21/78 219/121.72 |
| 2001/0045128 A1 * | 11/2001 | McCall .................. G01C 21/16 73/511 |
| 2003/0173556 A1 * | 9/2003 | Watson ................ B23Q 1/0009 254/389 |
| 2007/0209029 A1 * | 9/2007 | Ivonin ................ G03F 7/70191 430/311 |
| 2010/0087949 A1 | 4/2010 | Coleman et al. |

OTHER PUBLICATIONS

Zhuang et al. "High speed machining tool path generation for pockets using level sets," International Journal of Production Research, vol. 48, Issue 19, 2009.

\* cited by examiner

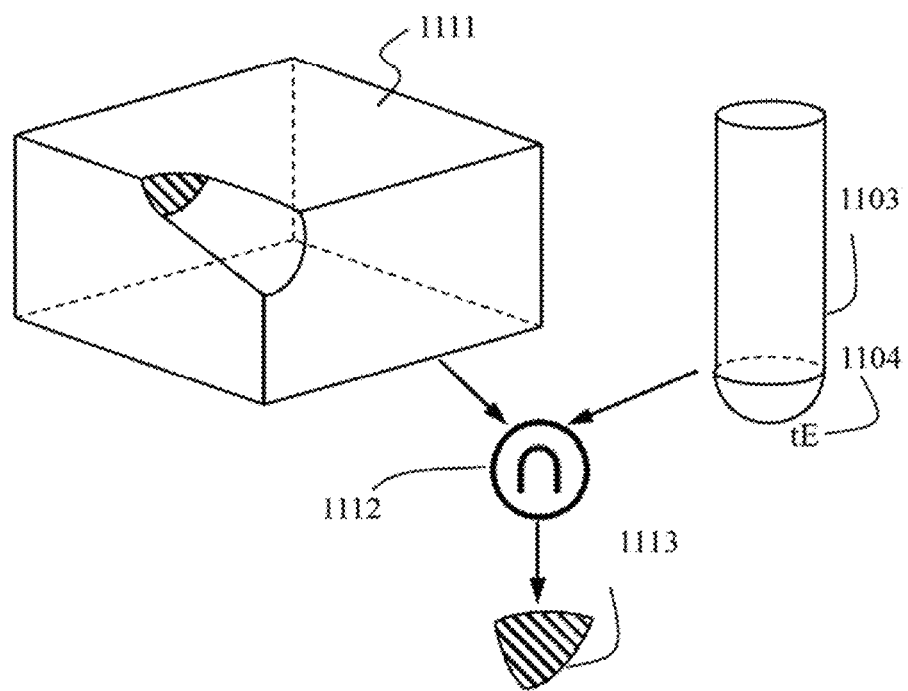
Fig. 11C
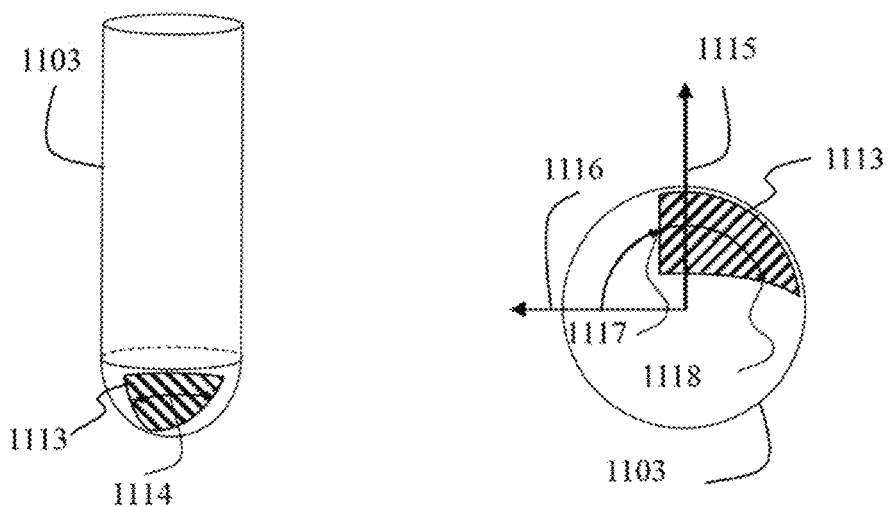
Fig. 11D  Fig. 11E

OSCILLATOR-BASED PATH PLANNING FOR MACHINING OF A POCKET SHAPE IN WORKPIECE

FIELD OF THE INVENTION

This invention relates generally to computer aided manufacturing, and more specifically to a method for generating paths for tools machining a pocket shape in a workpiece.

BACKGROUND OF THE INVENTION

NC Machining

Simulating numerically controlled (NC) milling or other types of machining is of importance in computer aided design (CAD) and computer aided manufacturing (CAM). During simulation, a workpiece model interacts with a computer representation of a tool and its motions.

The workpiece model and tool representation can be visualized during the simulation to improve productivity, tool path planning, detect potential collisions between parts, such as the workpiece and the tool holder, and to verify the final shape of the workpiece. The tool motions are typically implemented using numerical control programming language, also known as preparatory code or G-Codes, see, e.g., the RS274D and DIN 66025/ISO6983 standards.

During milling, the tool moves relative to the workpiece according to a prescribed tool motion, referred to herein as a tool path. The path contains information about the relative position, orientation, and other shape data of the tool. As the tool moves along the tool, the tool carves out a "swept volume." During milling, as the tool moves along the path, a portion of the workpiece that is intersected by the swept volume is removed. This removal of the material can be modeled computationally as a constructive solid geometry (CSG) difference operation.

Swept volumes can be represented and approximated by polygonal methods, Z-buffer, depth pixel (dexel) method and voxel-based representations. Swept volumes of simple shapes moving along simple paths can sometimes be represented analytically, as described in U.S. Pat. No. 4,833,617. However, those methods do not generalize to complex shapes and complex tool paths.

Models of polygonal shapes can be encoded in a spatial hierarchy for efficient editing via CSG operations. The accuracy of those methods is limited by the size of the smallest voxel used to represent the swept volumes. Thus, those methods may either have limited accuracy or have prohibitive processing times and memory requirements for generating high precision models of swept volumes, or both. In addition, methods that approximate the swept volume as a series of discrete time steps have limited precision between the discrete time steps, and are subject to aliasing artifacts.

Distance fields are an effective representation for rendering and editing shapes, as described in U.S. Pat. Nos. 6,396,492, 6,724,393, 6,826,024, and 7,042,458. Distance fields are a form of implicit functions that represent an object. In particular, a distance field is a scalar field d that gives a shortest distance to the surface of the object from any point in space. A point at which the distance field is zero is on the surface of the object. The set of points on the surface of the object collectively describe the boundary of the object, also known as the d=0 iso-surface. The distance field of an object is positive for points inside the object, and negative for points outside the object.

Adaptively sampled distance fields (ADFs) use detail-directed sampling to provide a much more space and time efficient representation of distance fields than is obtained using regularly sampled distance fields. ADFs store the distance field as a spatial hierarchy of cells. Each cell contains distance data and a reconstruction method for reconstructing a portion of the distance field associated with the cell. Distance data can include the value of the distance field, as well as the gradient and partial derivatives of the distance field. The distance field within a cell can be reconstructed only when needed to reduce memory and computational complexity.

Alternatively, the edited shape can be represented implicitly as a composite ADF (CADF). The CADF is generated to represent the object, where the CADF includes a set of cells arranged in the spatial hierarchy. Each cell in the CADF includes a subset of the set of geometric element distance field functions and a reconstruction method for combining the subset of geometric element distance field functions to reconstruct a composite distance field of a portion of the object represented by the cell. Each distance field in the subset of distance fields forms a part of the boundary of the object within the cell, called the composite boundary.

High speed machining is important in the fields of die and mold manufacturing, aerospace and automotive industries. Characteristics of high speed machining are high spindle speed (rotational speed of cutting tool), high feedrate (rate at which the cutting tool moves), high machining efficiency and accuracy. The mechanical parts can include faces parallel or normal to a plane and free-form parts require a 2.5D rough milling of a workpiece, making pocket milling an important milling operations. In pocket milling, the material is removed from a predefined shape (pocket) with defined dimension layer by layer by flat-end mill tool.

The feedrate depends on the geometry of the tool path, thus the path strongly influences manufacturing time and cost. The general objective in pocket milling and material removal processes in general is to find a good/optimal tool path.

Two commonly used methods for tool path generation, based on zigzag and contour-parallel paths milling, are described in "A mapping-based spiral cutting strategy for pocket machining," Xu, Int J Adv Manuf Technol, 2012 and "High speed machining tool path generation for pockets using level sets," Zhunag, International Journal of Production Research, 2009.

Another method described in U.S. Pat. No. 6,591,158 uses the solution of Laplace's equation defined for the pocket region. A level sets of the principal eigenfunction to define a smooth low-curvature spiral path in a pocket interior to one that conforms to the pocket boundary. The spiral tool path generation method based on solving the partial differential equation has difficulty in controlling the distance between two level-set curves. The method is based on finite element solutions of a PDE (Partial Differential Equation) including discretization of the pocket region into a triangular mesh with many elements, which result in the complicated way to connect concentric closed curves.

Another method described in U.S. Pat. No. 6,591,158 forms a spiral tool path by determining a plurality of relatively low-curvature nested contours that are internal to the boundary of the pocket to be formed, and spiraling between the contours. The nested contours arc determined from a mathematical function. Some methods described in U.S. Pat. Nos. 7,451,013, 7,577,490, 7,831,332 and 8,000,834 use constant engagement milling for generating a tool path for milling a pocket based on controlling engagement angle. However, such milling strategies force the milling cutter to execute sharp turns resulting in widely varying cutter engagement. Such variations in tool engagement cause spikes in tool load producing undesirable effects such as shorter tool life, chatter vibrations and even tool breakage.

The method described in U.S. Pat. No. 7,877,182 for creating spiral swath patterns for convex polygon shaped field boundaries a computationally efficient method for generating a spiral swath pattern for a region of a field bounded by a convex polygon is described. The method automatically generates curved portions for the swept trajectory having radii of curvature greater than a minimum turning radius based on the minimum turning radius and a definition of the field boundary.

In high performance milling, the technology described in U.S. Pat. No. 8,295,972 and U.S. Application 20100087949 for milling selected portions of a workpiece by a cutting, tool of a numerical control machine is described in order to reduce machining time and load. When milling along a path of constant curvature with a constant feed rate, a constant material removal rate is established.

However, determining the path of the tool machining the pocket shape remains a difficult problem in the art of NC machining.

SUMMARY OF THE INVENTION

It is an object of various embodiments of an invention to determine a path of a tool machining a pocket shape in a workpiece. It is another object of some embodiments to determine the path that optimizes a metric of performance of the machining. Examples of the metric of performance include one or combination a length of the path, a curvature of the path, an engagement angle of the tool, an area or a volume removed by machining.

Some embodiments disclose a method for determining a spiral curve for the pocket shape boundary given by a closed curve in the x-y plane, such that the spiral curve winds around an initial engagement point, eventually morphing into the boundary of the pocket.

Some embodiments of the invention are based on a realization that the pocket shape given by a closed curve in the x-y be embedded in a function that is positive within the pocket shape and zero on the boundary of the shape. Such function can represent the total energy of an oscillator with position x and velocity y. The equation of the motion of the oscillator having that total energy can be derived. This equation of motion with some added negative damping, supplies a curve that starts inside the pocket shape spirals outwards and eventually tracks the boundary of the shape.

Oscillator-based path planning for pocket milling provides a one way to interconnect layers of path. In addition, some embodiments further optimize the path for different tool and milling objectives by varying damping of the equation of motion. Notably, the method used by some embodiment of the invention does not require calculating the level sets, and solving for partial differential equations. Also, the method eliminates generating an offset that can result in self-intersection and discontinuity.

One embodiment determines the paths of the tool with minimal time and minimal number of sharp turns to improve productivity in pocket and rough machining by flat-end mill tools. The initial tool paths are obtained by using a positive function, such as Rvachev (R)-functions, whose sign does not change if none of the signs of its arguments change. The R-function is optimized according to constraints such as low curvature, minimum length tool path using machine tool limitations, engagement angles, removed volume and cutting force information.

Accordingly, one embodiment discloses a method for determining a path of a tool machining a pocket shape in a workpiece, wherein the pocket shape is a closed curve in an x-y plane. The method includes determining positions and velocities of a motion of an oscillator having an energy defined by a function that is positive within a boundary of the pocket shape and equals zero on the boundary of the pocket shape; and determining coordinates of the path of the tool based on corresponding pairs of position and velocity values of the motion, wherein a position value of each pair represents an x coordinate of the path of the tool in the x-y plane, and a velocity value of each pair represents a y coordinate of the path of the tool in the x-y plane. The steps of the method are performed by a processor.

Another embodiment discloses a system for determining for determining a path of a tool machining a pocket shape given by a closed curve on an x-y plane, including a processor for determining positions and velocities of a motion of an oscillator having an energy defined by a function that is positive within a boundary of the pocket shape and equals zero on the boundary of the pocket shape and for determining coordinates of the path of the tool based on corresponding pairs of position and velocity values of the motion, wherein a position value of each pair represents an x coordinate of the path of the tool on the x-v plane, and a velocity value of each pair represents a y coordinate of the path of the tool on the x-y plane.

BRIEF DESCRIPTION OF THE DRAWINGS

FIGS. 11B and 11C are diagrams of method for determining a removed volume, in-process workpiece and engagement surface between a tool and in-process workpiece according to embodiments of an invention;

FIG. 11D is a perspective view showing the engagement surface and angle of engagement on the tool boundary according to some embodiments of the invention;

FIG. 11E is a top view corresponding to FIG. 11D;

DETAILED DESCRIPTION OF THE PREFERRED EMBODIMENT

System and Method Overview

Figure 1:
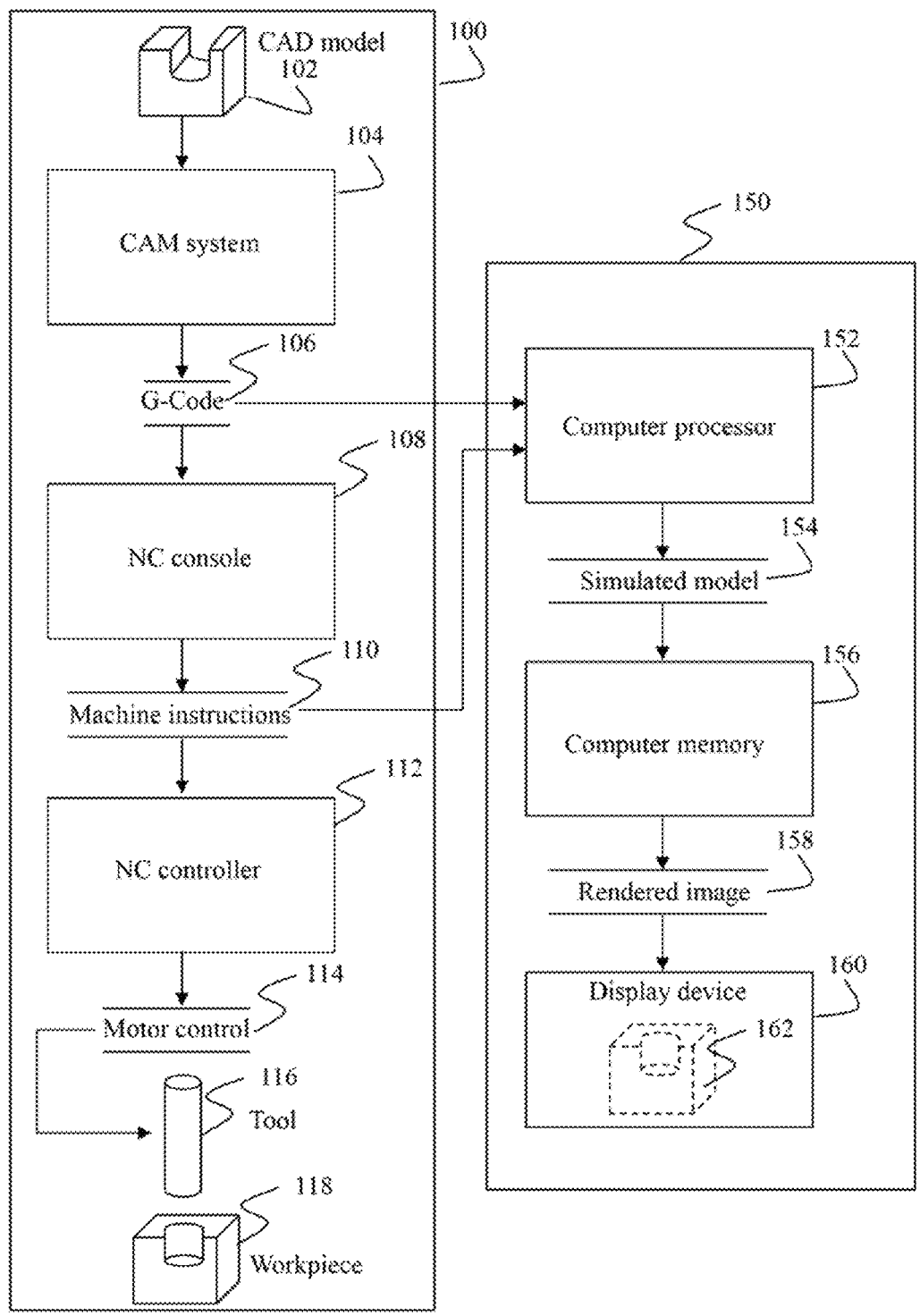
FIG. 1 is as flow diagram of the operation of an NC milling machine and a system and method for simulating NC milling according to embodiments of the invention.

FIG. 1 shows an NC machining system, such as a milling system 100, and a numerically controlled (NC) milling simulation system 150. In the NC milling system 100, a computer aided design (CAD) model 102 is input to a computer aided Manufacturing (CAM) system 104, which generates G-Codes 106 for controlling a NC milling machine. During NC milling, the G-Codes are input to a NC milling input interface or NC console 108, which processes each G-Code to produce a corresponding set of NC machine instructions 110. The NC machine instructions are input into an NC controller 112, which produces a set of motor control signals 114 to move a tool 116 relative to a workpiece 118 in order to mill the workpiece.

The simulation system 150 can take as input either the G-Codes 106 generated by the CAD system 104, or the NC machine instructions 110 generated by the NC console 108. The input to the simulation system is sent to a computer processor 152, which simulates machining of the workpiece, and outputs a simulated model. 154, which can be stored in a computer memory 156. The processor 152 can render the stored simulated model 154 to generate a rendered image 158 which can be output to a display device 160. A displayed image 162 can be compared to the computer aided design model 102 to verify the G-Codes 106 or NC machine instructions 110 prior to performing the actual NC milling of the workpiece.

Figure 2A:
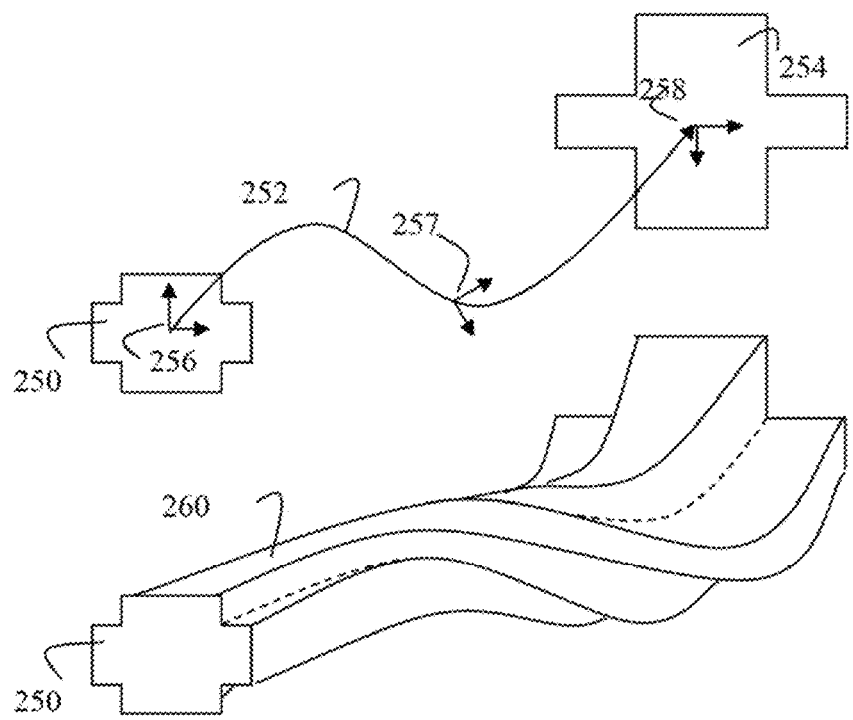
FIG. 2A is a schematic of a swept volume determined by sweeping a 2D shape along a curved path according to some embodiments of the invention.

FIG. 2A shows a swept volume 260 of a shape 250 that is moved along a path 252. The path 252 specifies a position of a particular point of the shape 250 as a function of time. The path can specify orientations 256, 257, and 258 of the shape as a function of time. The path can also specify a scale of the shape or an arbitrary transformation of the shape as a function of time. The original position, orientation, and geometry of a shape 250 are transformed to a final position, orientation, and geometry of the shape 254 as the shape moves along the path.

Figure 2B:
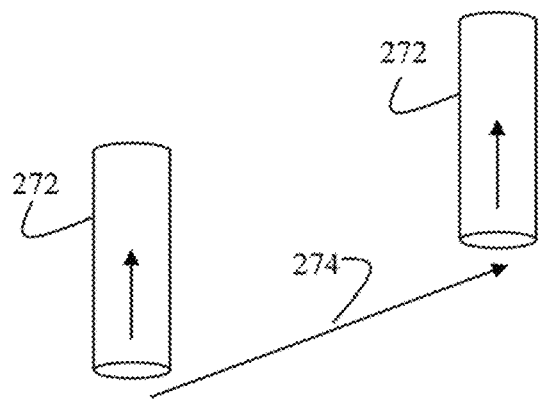
FIG. 2B is a schematic of a linear path of a tool according to some embodiments of the invention.
Figure 2C:
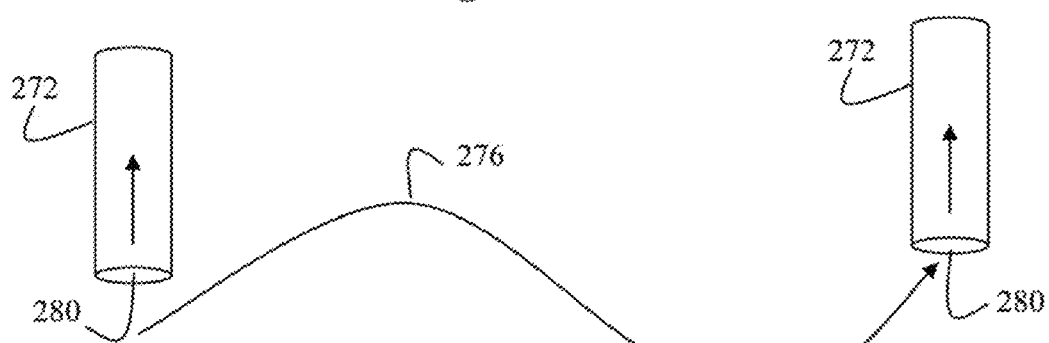
FIG. 2C is a schematic of a curve path of a tool according to some embodiments of the invention.

The path of the tool relative to the workpiece can be specified in many forms. FIG. 2B shows a linear path 274, in which a tool 272. FIG. 2C shows a curved path, in which a tip 280 of the tool 272 is moved along a curve 276. Other possible path forms include positioning the tool at a point, moving the tool along a sequence of line segments known as a polyline, moving the tool along a spiral or helical curve, moving the tool along a polynomial curve, such as a quadratic Bezier curve or a cubic Bezier curve, or a sequence of polynomial curves known as a piecewise polynomial curve to name, but a few.

Figure 3A:
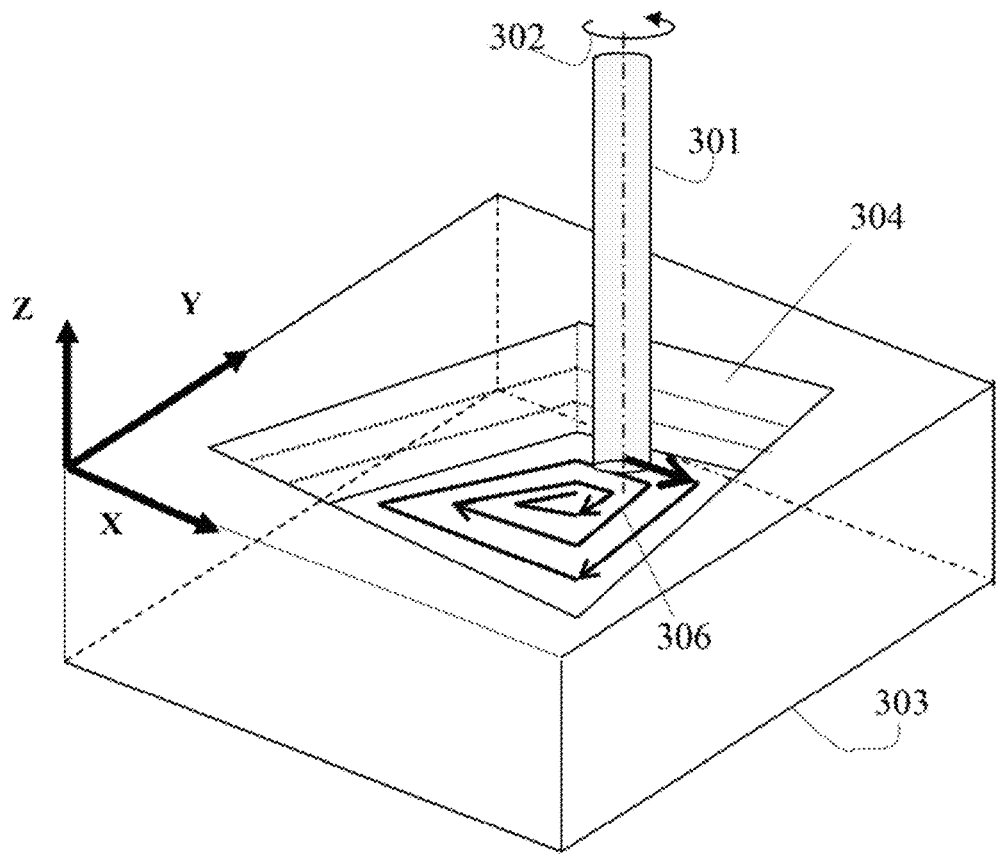
FIGS. 3A and 3B are schematics of machining a pocket shape in a workpiece according to some embodiments of the invention.
Figure 3B:
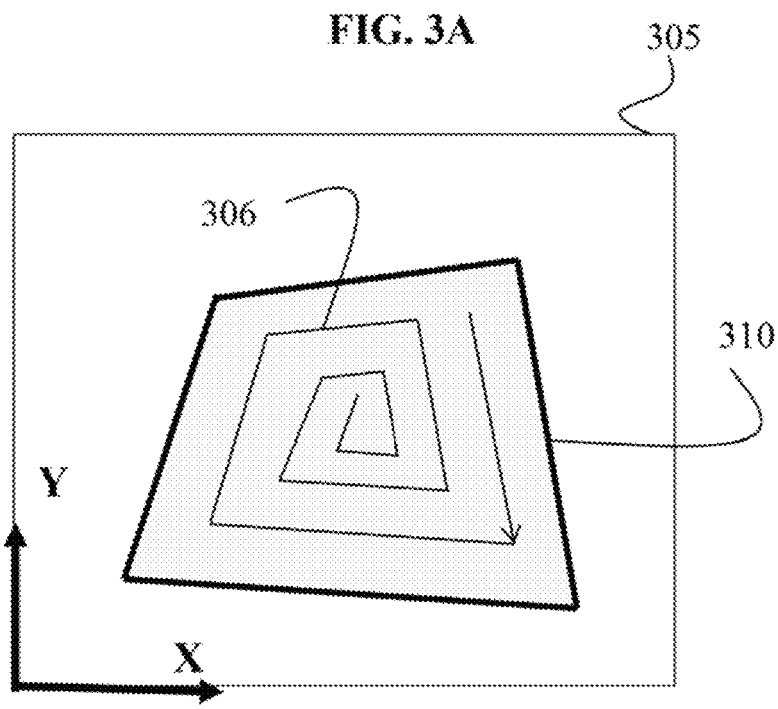

FIGS. 3A and 3B show schematics of machining a pocket shape 304 in a workpiece 303. The machining is performed by a motion 302 of a tool 301 according to a path 306. The pocket shape is given by a closed curve 310 in an x-y plane 305.

Figure 4:
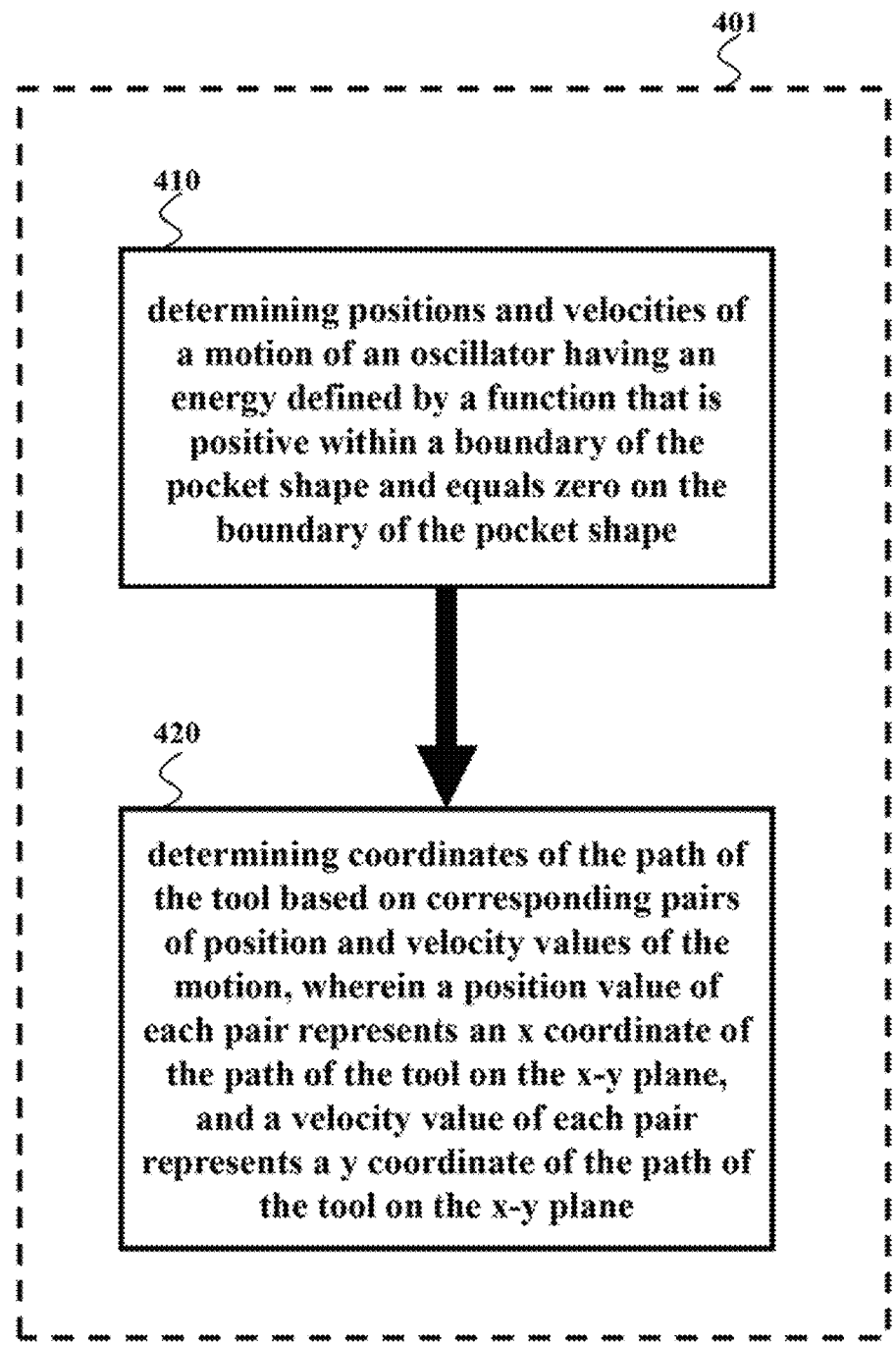
FIG. 4 is a block diagram of a method for determining a path of a tool machining a pocket shape according to some embodiments of the invention.

FIG. 4 shows a block, diagram of a method for determining a path of a tool machining a pocket shape given by a closed curve in an x-y plane according to some embodiments of the invention. The method determines 410 positions and velocities of a motion of an oscillator having an energy defined by a function that is positive within a boundary of the pocket shape and equals zero on the boundary of the pocket shape. Next, the method determines 420 coordinates of the path based on corresponding pairs of position and velocity values of the motion, wherein a position value of each pair represents an x coordinate of the path in the x-y plane, and a velocity value of each pair represents a y coordinate of the path of the tool in the x-y plane, wherein steps of the method are performed by a processor. Steps of the method can be performed by a processor 401, which can be a processor of the simulation system 150.

In some embodiments, the positions and the velocities of the motion of an oscillator are determined as a function of time. Accordingly, the coordinates are determined as the function of time based on times of the corresponding pairs of position and velocity values. Also, in some embodiments, an initial engagement point between the tool and a workpiece is selected as a starting point of the motion al the oscillator.

Some embodiments of the invention are based on a realization that the pocket shape given by a closed curve in the x-y can be embedded in a function that is positive within the pocket shape and zero on the boundary of the shape. Such function can represent the total energy of an oscillator with position x and velocity y. The equation of the motion of the oscillator having that total energy can be derived. This equation of motion with sonic added negative damping supplies a curve that starts inside the pocket shape spirals outwards and eventually tracks the boundary of the shape.

An oscillator-based path planning for pocket miffing provides a one way to interconnect layers of tool path. In addition, some embodiments further optimize the path for different tool and milling objectives by varying damping of the equation of motion. Notably, the method used by some embodiment of the invention does riot require calculating the level sets, and solving for partial differential equations. Also, the method eliminates the generation of an offset curve that can result in self-intersection and discontinuity.

Figure 5:
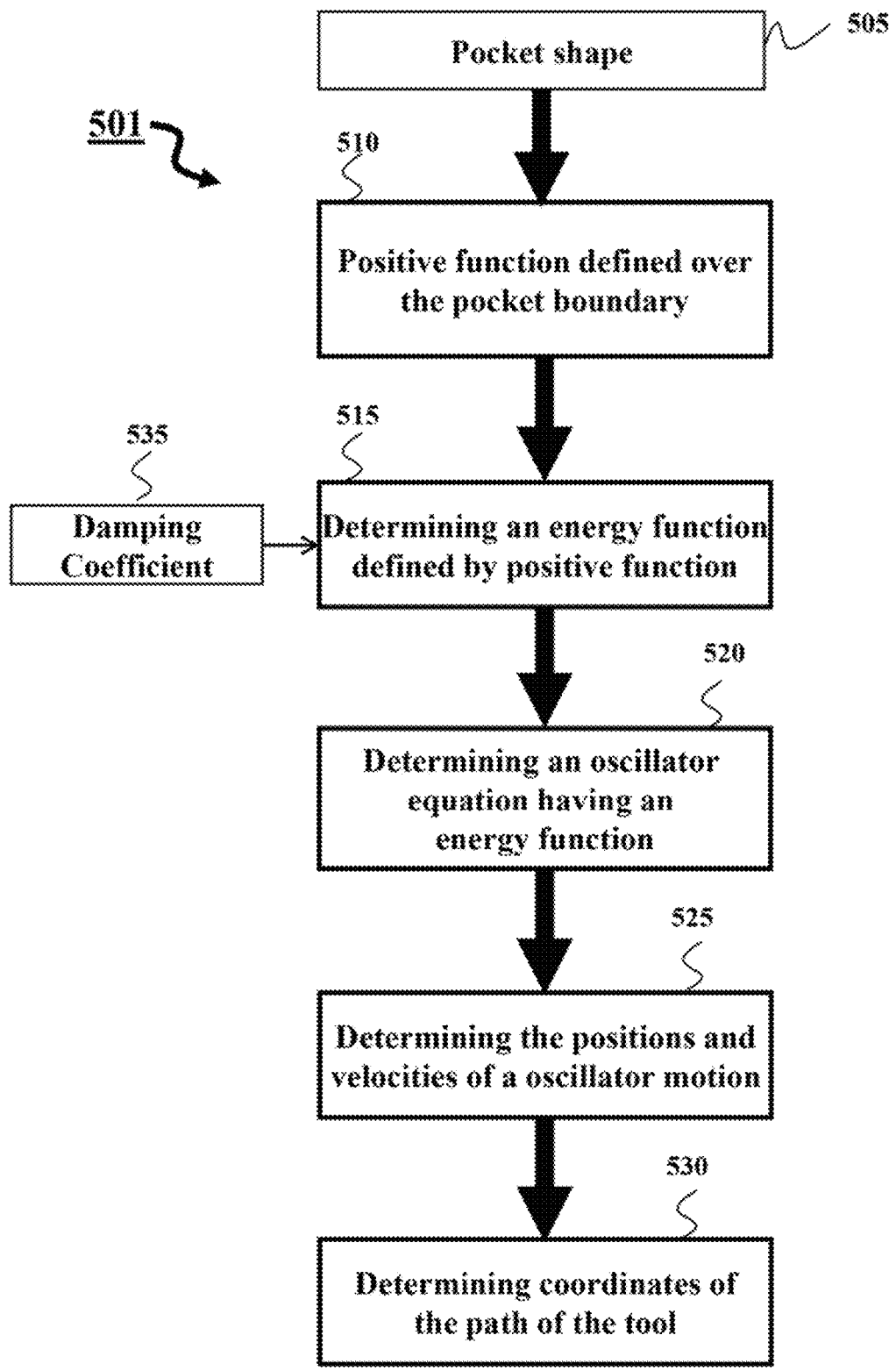
FIG. 5 is a block diagram of a method for determining a path of a tool machining a pocket shape according to one embodiment of the invention.

FIG. 5 shows a block diagram of a method 501 for determining the path of a tool machining the pocket shape using the abovementioned principles according to some embodiments of the invention. The method determines 510 a positive function defined over the boundaries of the pocket shape 505. The function is positive, i.e., has only positive values, within the boundaries of the pocket shape and is zero on the boundary of the shape. An example of such a function is an implicit function such as a Rvachev (R)-function.

For example, some embodiments represent a complex pocket shape as combinations of simpler shapes. The compactness of such representation is an important factor, because simple implicit functions often require few coefficients, whereas parametric surfaces need complex control meshes and need a larger data storage. R-functions are R-functions-real-valued functions that behave as continuous analogs of logical (Boolean) functions. With R-functions, it is possible to construct functions with prescribed values and derivatives at specified locations, assisting in the solution of boundary value problems. R-functions can be used to define the approximate or exact distance functions over a given semi-analytic domain.

In some embodiments, an implicit function is a function $f(x_1, x_2, \ldots, x_n)=y$ has zero values at desired locations in space. Thus, the zero set of the function implies the geometry of the defined set of points forming the boundaries of the pocket shape. The implicit functions therefore define the geometric model (or portions thereof) by having points within the model and/or its boundary take a zero value and points outside the model take other discrete values.

The method 501 determines 515 an energy function defined by the positive function and includes a damping term 535 in the energy function. Next, an equation describing the motion of the oscillator according to the energy function is determined 520 and solved 525 with respect to time to determine a set of position and velocity values of the motion of the oscillator for a corresponding set of time instants. The coordinates of the path of the tool at each time instants are determined 530 as corresponding to position and velocity values of the motion.

Figure 6A:
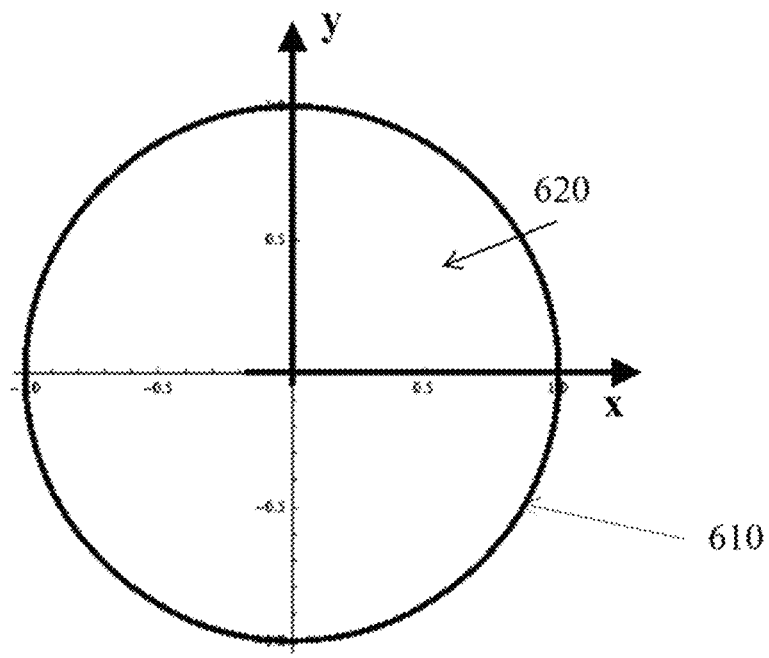
FIG. 6A is exemplar geometry of pocket: shape defined by its boundary according, to some embodiments of the invention.
Figure 6B:
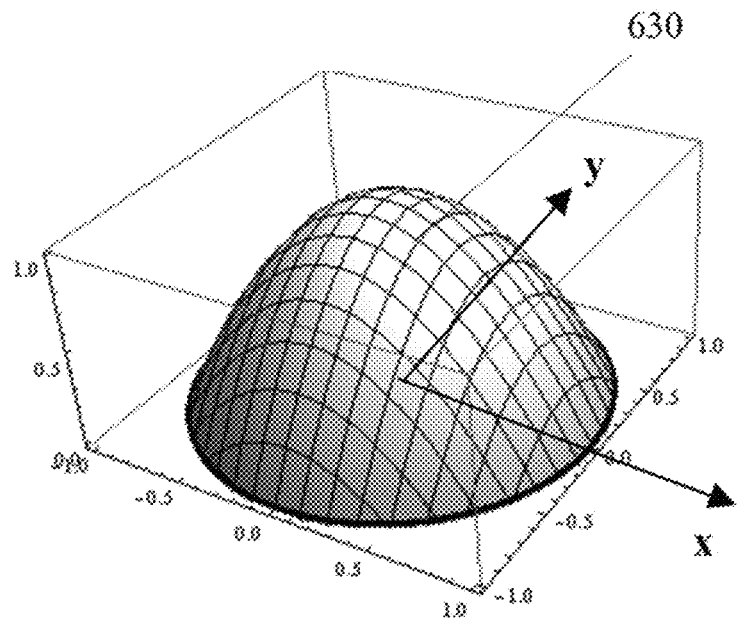
FIG. 6B is a positive function defined over the pocket shape of FIG. 6A according to some embodiments of the invention.

FIG. 6A shows an exemplar geometry of pocket shape S 620 defined by a boundary 610. FIG. 6B shows a positive function 630 defined over the pocket shape 620. In this example, the pocket shape S 620 and the boundary ∂S 610 are embedded in a function f(x, y) that is positive over the x-y plane within the pocket shape and zero on the boundary. For example, the pocket S specified is the unit disk ($x^2+y^2 \leq 1$), and its boundary ∂S is the unit circle $x^2+y^2=1$ as shown in FIG. 6A. The boundary is the zero level set of the function $f(x, y)=1-(x^2+y^2)$, i.e., f(x, y)=0 shown in FIG. 6B.

Figure 7A:
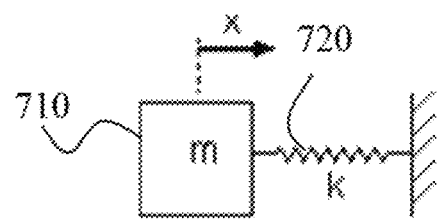
FIG. 7A is a schematic of a one degree-of-freedom (DOF) mass-spring oscillator.

FIG. 7A shows a schematic of a one degree-of-freedom (DOF) mass-spring (harmonic) oscillator. The oscillator includes a mass 710 and a spring 720 having a stiffness k. The states of this oscillator include positions x(t) and velocities $y(t)=\dot{x}(t)$, wherein t is an independent time variable parameterizing the motion.

Figure 7B:
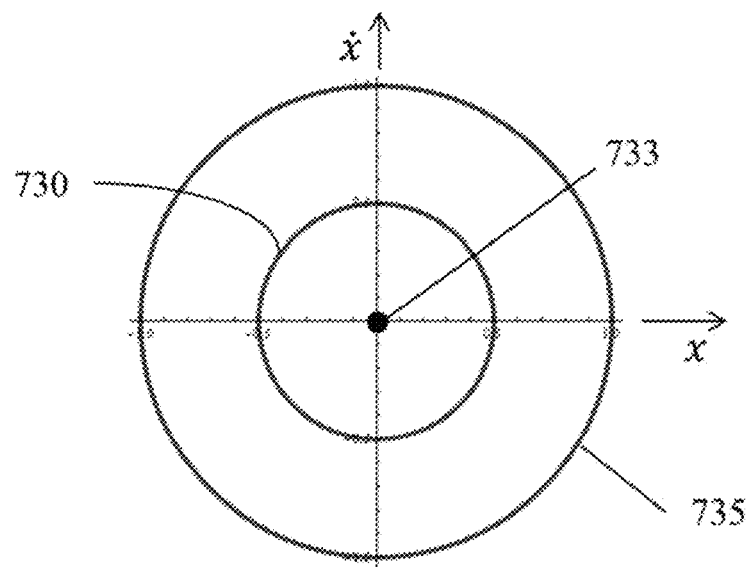
FIG. 7B is a top view of the evolution of the states of the oscillator of FIG. 7A.
Figure 7C:
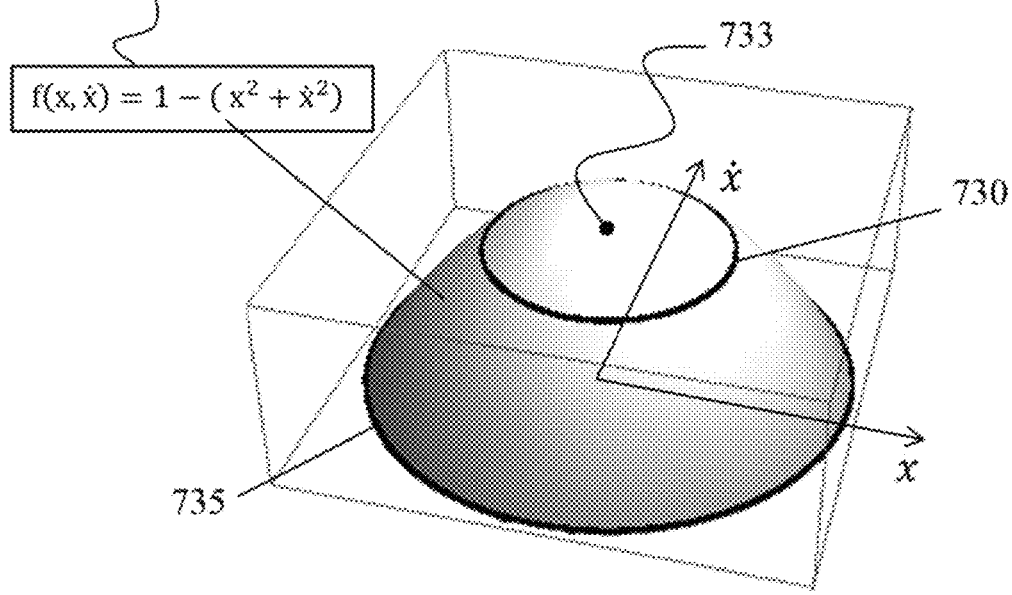
FIG. 7C is an isometric view of the evolution of the states of the oscillator of FIG. 7A.

FIG. 7B shows a top view of the evolution of the states of the oscillator of FIG. 7A, FIG. 7C shows an isometric view of the evolution of the states of the oscillator. The curves, i.e., circles, correspond to the motion of the oscillator with total energy $$E(x, \dot{x}) = \frac{1}{2}x^2 + \frac{1}{2}\dot{x}^2 = const.$$

For example, a circle 730 corresponds to $$E(x, \dot{x}) = \frac{1}{2}.$$

The circle 735 corresponds to $E(x,\dot{x})=1$. The point 733 corresponds to $E(x,\dot{x})=0$.

The function 740

$$f(x,\dot{x})=1-(x^2+\dot{x}^2) \quad (1)$$

is positive over the domain $x^2+y^2<1$ and disappears on its boundary, thereby having the "embedding" properties described in equation (1). The function f(x,ẋ) 740 is related to the total energy of the oscillator, in that $f(x,\dot{x})=1-2E(x,\dot{x})$.

Some embodiments of the invention determine an equation describing the motion of the oscillator defined by a function that is positive within a boundary of the pocket shape and equals zero on the boundary of the pocket shape by differentiating the total energy with respect to time as $$\frac{dE(x, \dot{x})}{dt} = x\dot{x} + \dot{x}\ddot{x} = 0 \Rightarrow \ddot{x} + x = 0. \quad (2)$$

The curves of FIGS. 7B and 7C are disconnected because the curves correspond to different constant values of the energy. Instead of trying to connect the closed curves corresponding to constant energies of the oscillator to obtain a spiral curve, sonic embodiments determine the connected spiral curve for the path of the machining tool by adding negative damping into the system of the oscillator.

Figure 8A:
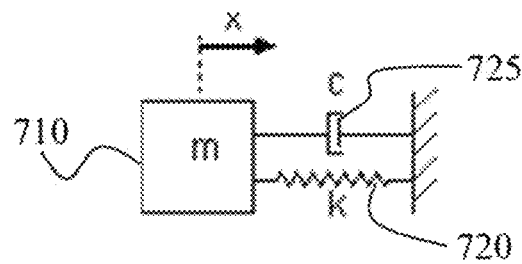
FIG. 8A is a schematic of an oscillator having a damper resulting into adding an energy injector to the oscillator according to some embodiments of the invention.

FIG. 8A shows an oscillator having a damper 725 resulting into adding an energy injector to the oscillator. An addition of the damping term result in the equation of motion of the oscillator according to $$\ddot{x}-2\xi\dot{x}+x=0. \quad (3)$$

Figure 8B:
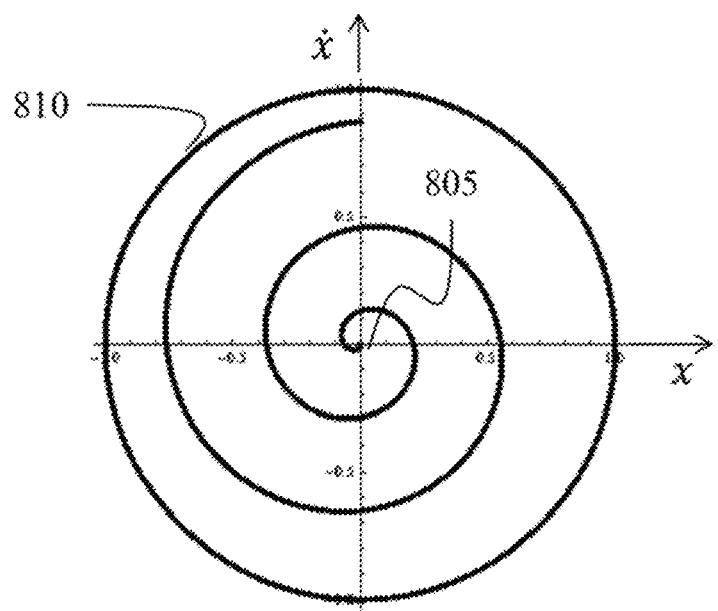
FIGS. 8B and 8C are illustrations of a solution of equation of a spiral motion of the oscillator according to some embodiments of the invention.
Figure 8C:
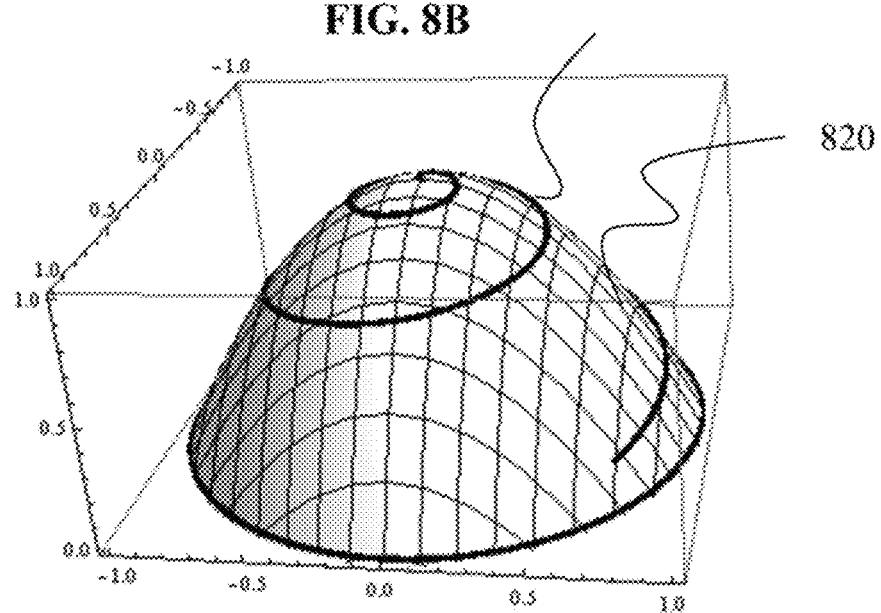

FIGS. 8B and 8C illustrate a solution of this equation (3) resulting in a logarithmic spiral 810 starting from a point 805 close to the origin and spiraling outward from the origin on the energy surface 820 in the (x, ẋ) plane in FIG. 8C.

To generalize from the example, various embodiments determine a function f(x, y) that is positive over the given pocket shape S and zero at the boundary (we use R-functions for this purpose) and consider this function as the "total energy" of a one-degree-of freedom oscillator. The original spatial coordinates (x, y) now correspond to position x and velocity ẋ of the oscillator. The motion of the oscillator is fully characterized by a trajectory in the (x, ẋ) plane. If the oscillator is conservative (i.e. some energy-like quantity is constant along trajectories), the trajectories are (in general) closed curves corresponding to constant total energy and are level sets of f(x(t), ẋ(t)), i.e.

$$f(x(t), \dot{x}(t)) = \text{const.} \qquad (4)$$

The equation of motion of the oscillator is determined by differentiating eq. (4) with respect to time $$\frac{\partial f(x(t), \dot{x}(t))}{\partial x(t)} \dot{x}(t) + \frac{\partial f(x(t), \dot{x}(t))}{\partial \dot{x}(t)} \ddot{x}(t) = 0. \qquad (5)$$

To make a transition between the closed curves of this conservative system, a negative damping term ξ is introduced in the equation of motion (5)

$$\frac{\partial f(x(t), \dot{x}(t))}{\partial x(t)} \dot{x}(t) + \frac{\partial f(x(t), \dot{x}(t))}{\partial \dot{x}(t)} (\ddot{x}(t) - 2\xi \dot{x}(t)) = 0, \qquad (6)$$

wherein x(t), ẋ(t) and ẍ(t) are the position, velocity and acceleration of the oscillator, respectively and ξ is the damping coefficient.

Figure 9A:
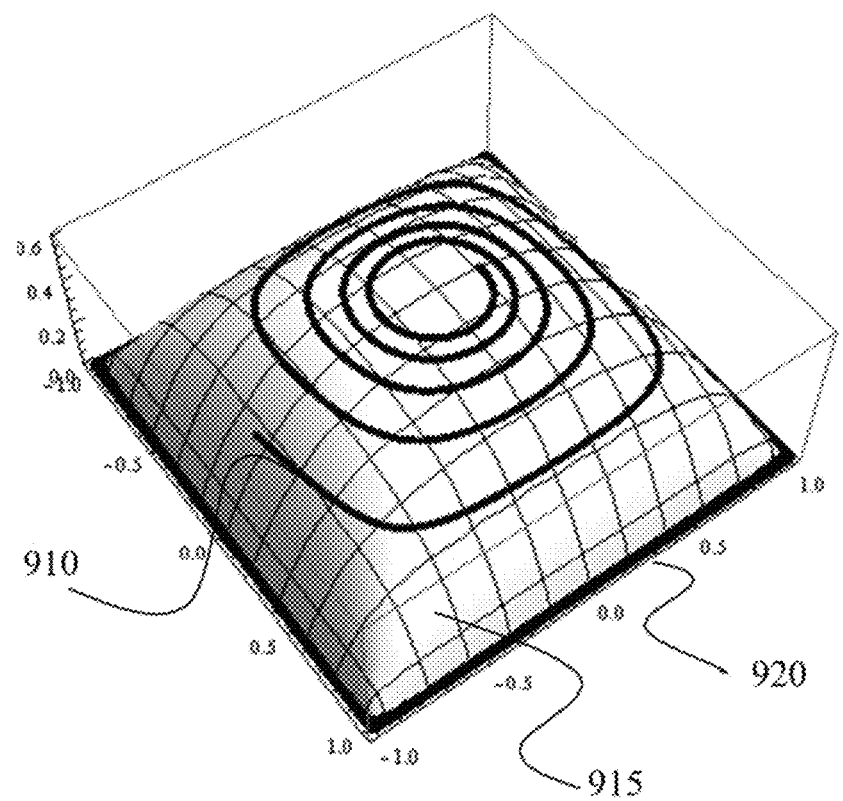
FIGS. 9A and 9B are isometric and top view of a path machining a square pocket shape according to one embodiment of the invention.
Figure 9B:
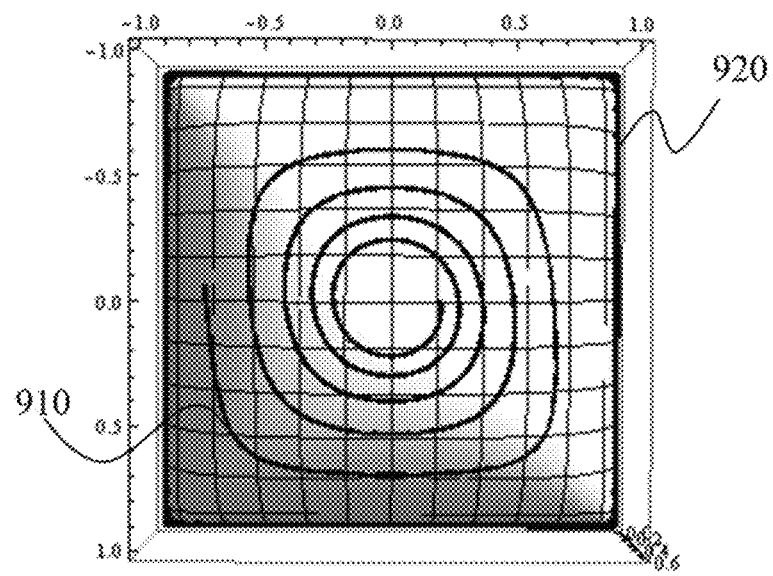

FIGS. 9A and 9B show isometric and top views of a result of applying one embodiment for a square pocket shape given by the boundaries 920. The spiral curve 910 is determined on the energy surface 915.

Some embodiments of the invention are based on another realization that the damping coefficient can serve as a parameter for the optimization problem. For example, some embodiments solve, the equation of the motion with different values of the damping term to produce a set of paths of the tool and select from the set the path corresponding to an optimal metric of performance or constraints of the machining. Examples of the constraint include a degree of a curvature, a length tool path, an angle of engagement of the tool, an amount of a removed volume, and a cutting force of the tool. To evaluate the metric, of performance or test for the constraints, some embodiments simulate the machining of the workpiece with a motion of the tool according to the path determined by various embodiments of the invention.

Figure 10A:
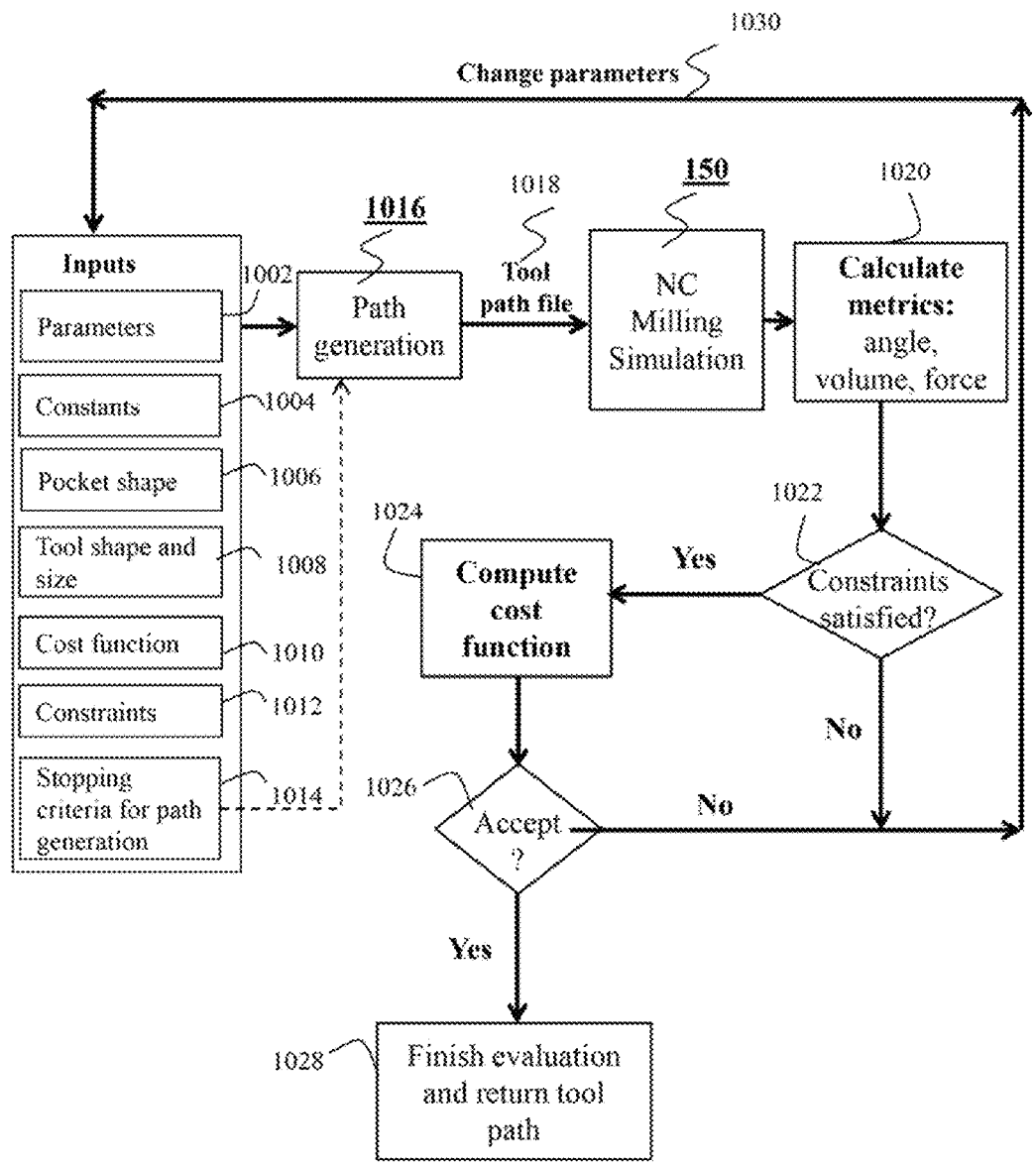
FIG. 10A is a block diagram of a method for determining a tool path of a tool machining a pocket shape according to one embodiment of the invention.

FIG. 10A shows a block diagram of a method according to some embodiments of the invention for determining a tool path of a tool machining a pocket shape 1006. Other inputs can include one or combination of parameters 1002, such as parameters of the machining or the value of the dumping term, various constants 1004 such as initial conditions of the machining, shape and size 1008 of the tool of the machining, cost function 1010 evaluating a metric, of performance of the machining, constraints 1012 to be satisfied by the machining, and stopping criteria 1014.

Figure 10B:
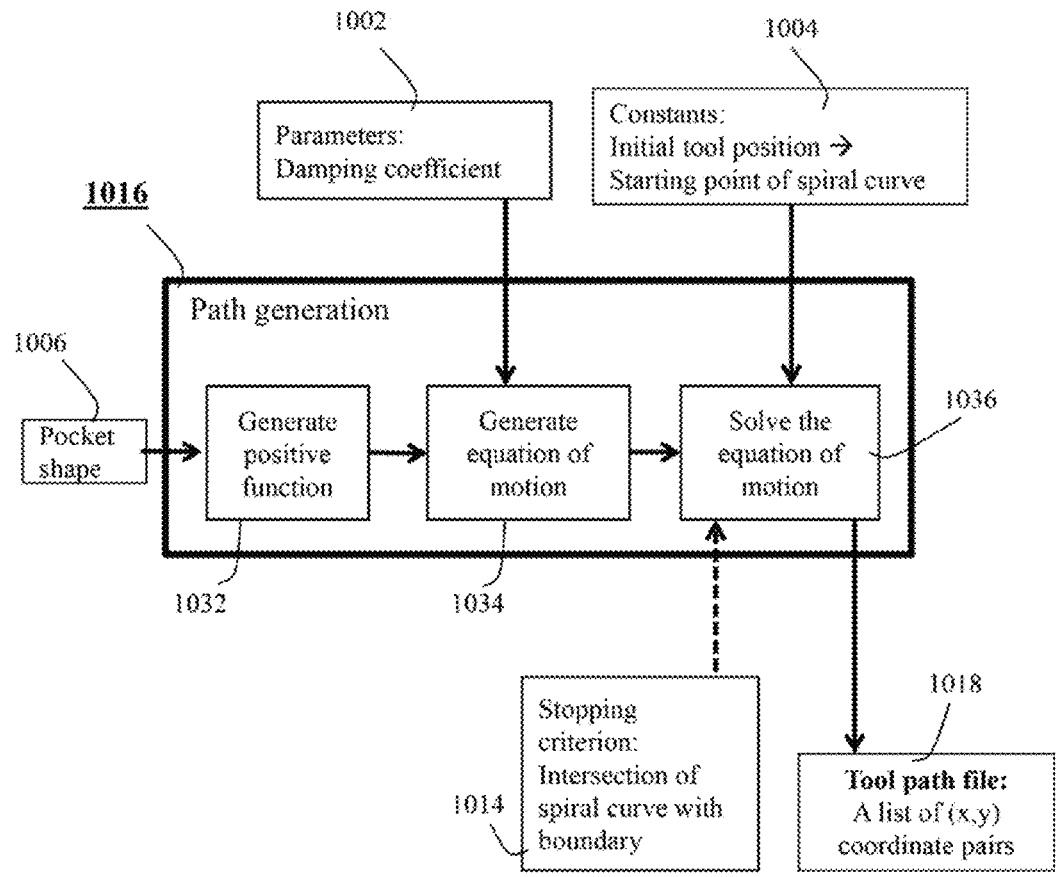
FIG. 10B is an example of a path generation module according to some embodiments of the invention.

FIG. 10B shows an example of a path generation module 1016 according to some embodiments. The path generation includes determining a positive function embedding the pocket shape 1032, with a subsequent generation of the equation of the motion 1034 with given parameters 1002 and solving this equation of motion 1036 with a given initial conditions 1004 until when the stopping criterion 1014 is satisfied. The path generation can return a tool path file in the form of a list of (x, y) coordinate pairs 1018.

This tool path file is used in the NC milling simulation 150 to calculate various metrics 1020 of performance and to check whether the constraints 1012 are satisfied 1022. The constraints can be user defined. The acceptance 1026 of the final tool path 1028 is based on the computed cost function 1024. Examples of cost function 1024 can include a comparison of one or several metric of performance of the tool path 1018.

For example, one embodiment simulates the machining a workpiece by the motion of the tool according to each path from the set of paths of the tool to produce a set of simulations and determines a metric of performance of each simulation from the set of simulations to produce a set of metrics. The embodiment selects the optimal metric of performance from the set of metrics according to a cost function. For example, the cost function can compare the metric, of performance with a predetermined threshold. Examples of the metric of performance can include, e.g., a size of engagement surface of the tool moving along the path or an amount of volume removed by the motion of the tool.

Engagement Surface and Removed Volume

FIGS. 11A, 11B, 11C, 11D and 11E shows an engagement surface and removed volume between a model of a tool and an in-process model of a workpiece according to an embodiment of the invention.

Figure 11A:
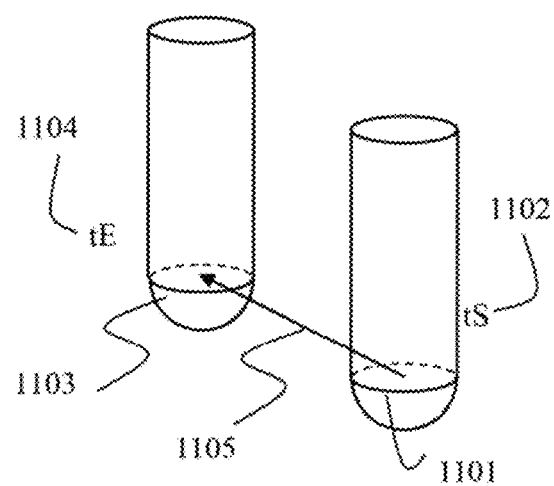
FIG. 11A is a diagram of tool instances for a tool path according to some embodiments of the invention.

FIG. 11A shows a linear path 105, in which a model of a milling tool at start time tS 1102 is moved from initial position 1101 of the tool path to a current position 1103 of tool path at a time tE 1104 along the path 1105 resulting in a swept volume 1106.

Figure 11B:
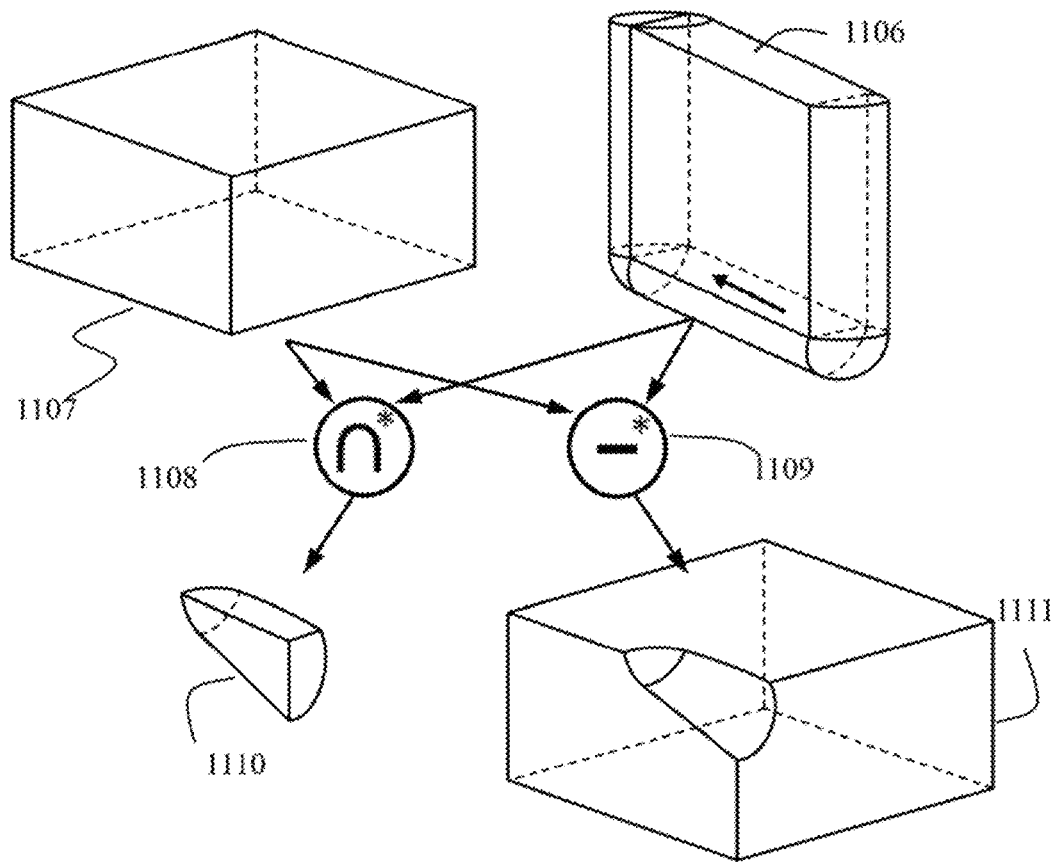

FIG. 11B shows the generation of in-process workpiece 1111 and removed volume 1110 by performing regularized Boolean intersection 1108 and regularized Boolean difference operations 1109 between the workpiece 1107 and swept volume 1106 according to a prescribed tool motion. Regularized Boolean operations ensure that the pair of solids always combines to yield solids.

FIG. 11C shows the engagement surface 1113 which is determined by intersection operation 1112 between the in-process workpiece 1111 and the tool in the position 1103 at the time tE 1104. This engagement surface defines the instantaneous intersection surface between the model of the tool and the in-process workpiece at each location along the tool path. As used herein, the engagement surface is an instantaneous contact surface between a model of the tool and a model of the in-process workpiece during machining.

FIG. 11D shows the engagement surface 1113 on the boundary of the tool in the position 1103 at time tE 1104. The angle of engagement 1114 is calculated by using the determined engagement surface 1113.

FIG. 11E shows the top view corresponding to tool and engagement surface given in FIG. 11D. Angle of engagement can be measured from the normal vector 1116 perpendicular to tangent tool path vector 1115. The entry angle 1117 is the angle at which the tool enters the workpiece, and exit angle 1118 is the angle at which the tool leaves the workpiece. The angle of engagement is basically the region between the exit and entry angles where the tool actually removes material and creates milling forces.

Figure 12:
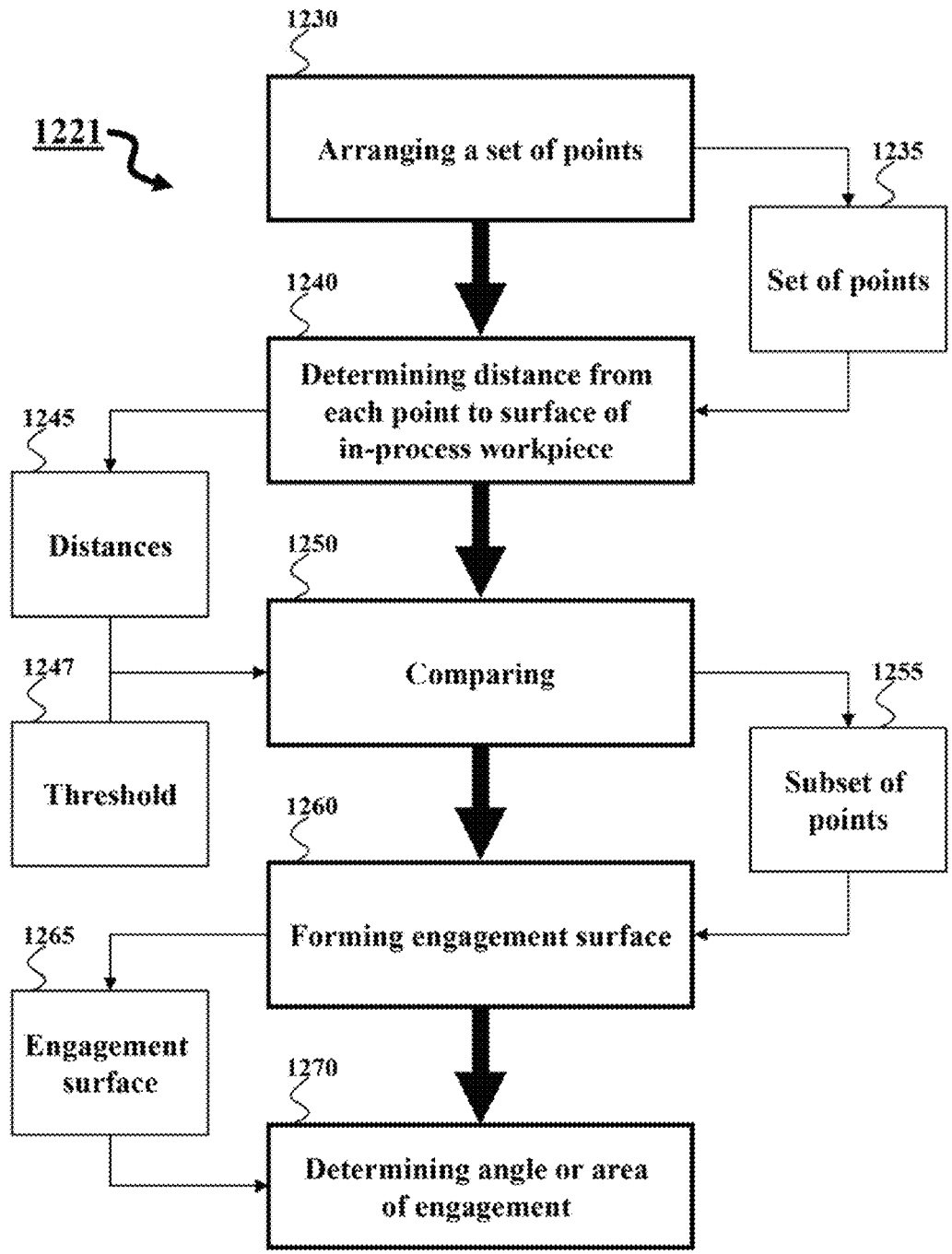
FIG. 12 is a flow diagram of a method for analyzing an engagement between the tool and the workpiece during, a simulation of a machining according to some embodiments of the invention.

FIG. 12 is a block diagram of a method for analyzing an engagement between the tool and the workpiece during a simulation of a machining according to some embodiments of the invention. In various embodiments, the workpiece is represented by a model of the workpiece including an object distance field defining a surface of the workpiece, the tool is represented by a model of the tool including a tool distance field defining a surface of the tool, and the motion is represented by at least one swept volume including a swept volume distance field defining a surface of the swept volume, as described in more details below. Steps of the method can be implemented using a processor 1221.

A set of points 1235 is arranged 1230 on at least a part of a surface of the tool. In various embodiments the set of points is arranged according to a sampling pattern, as described in more details below. Also, in some embodiments, the set of points are arranged using various techniques of software engineering and computer graphics. In another embodiment, the set of points is arranged in real time of simulation without creating a separate data structure.

For each point in the set, a distance 1245 between a point, and a surface of the workpiece modified by the motion is determined 1240, and compared 1250 with a threshold 1247 to determine a subset of points 1255 forming 1260 an engagement surface 1265. For example, the engagement surface is formed based on the subset of points having the distance below the threshold. Next, in some embodiments, an area and an angle of engagement between the tool and the workpiece are determined 1270 based on the engagement surface 1265.

Various embodiments of the invention are based on a realization that the swept volume corresponds to a maximum potential removed volume, so to determine the actual removed volume, the embodiments test a space internal to the swept volume. For example, various embodiments of the invention populate a space internal to the swept volume with a set of rays, and determine the removed volume based on intersections of the rays with the workpiece inside the swept volume. The populating of volume with rays can be done using various computer graphic techniques and according to various sampling patterns, as described in more details below.

Figure 13:
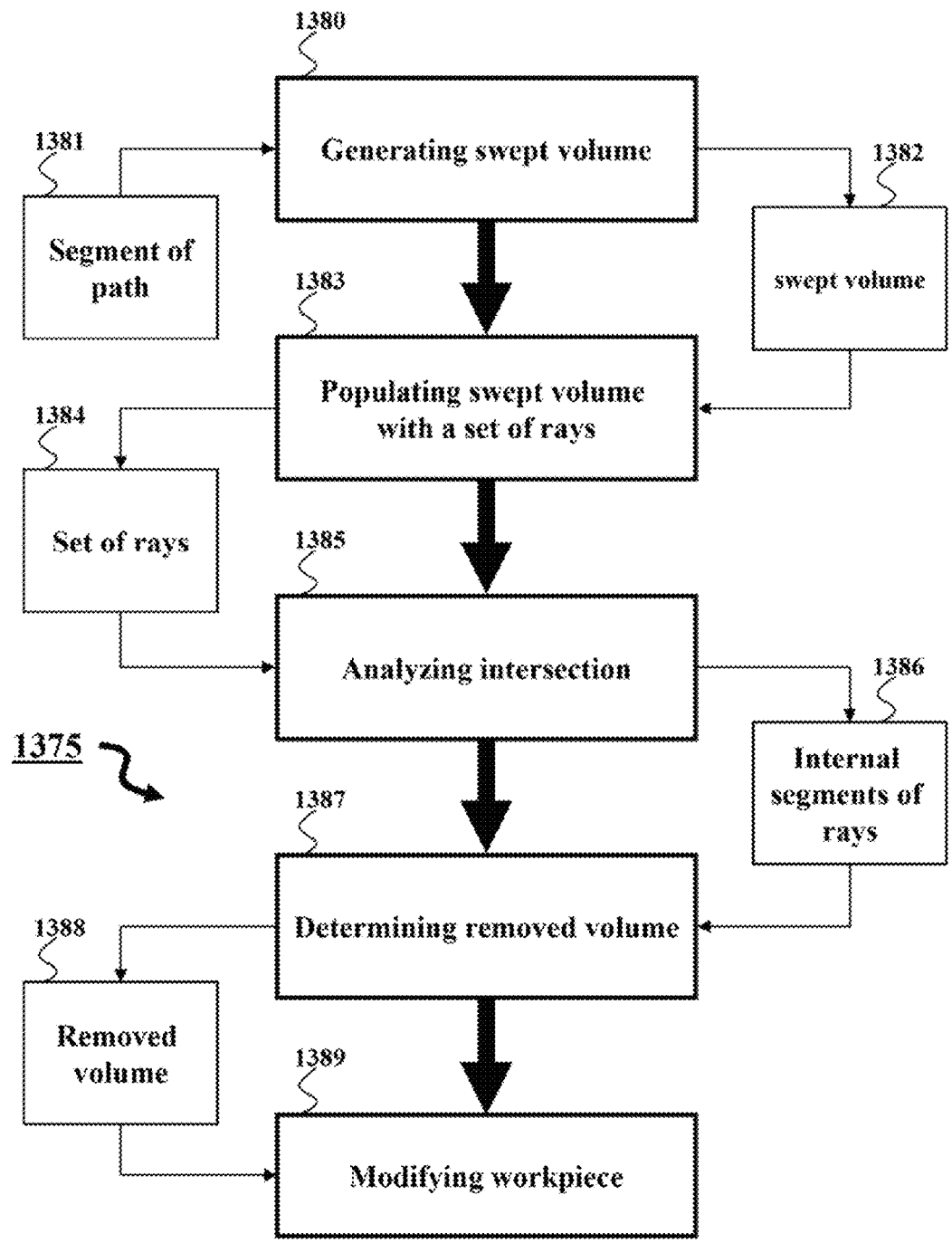
FIG. 13 is a flow diagram of a method for determining the removed volume between the milling tool and in-process workpiece according to embodiments of the invention.

FIG. 13 shows a block diagram of a method for simulating a machining of a workpiece by a tool according to some embodiments of the invention. The method generates 1380 a swept volume 1382 representing a motion of the tool in relation to the workpiece. The motion of tool can be simulated according to a segment 1381 of a path determined for the simulation of the machining. Next, the swept volume is populated 1383 with a set of rays 1384. The intersections of the rays with the workpiece are analyzed 1385 to determine segments of the rays 1386 internal to the workpiece. The volume 1388 removed from the workpiece is determined 1387 based on intersections of at least some rays with the workpiece. For example, the internal segments 1386 of the ray form the removed volume, which can be determined based on a number of the internal segments, distance between the internal segments, and the corresponding length and thickness of the internal segments. The workpiece is modified 1389 based on the volume, such that the machining is simulated. The steps of the method are performed by a processor 1375.

The ray casting allows computing the distances for each point along the ray until the ray intersects the surface. Especially, the distance fields differentiate by its sign information whether the point is within the swept volume or not.

Determining Engagement Surface

Figure 14:
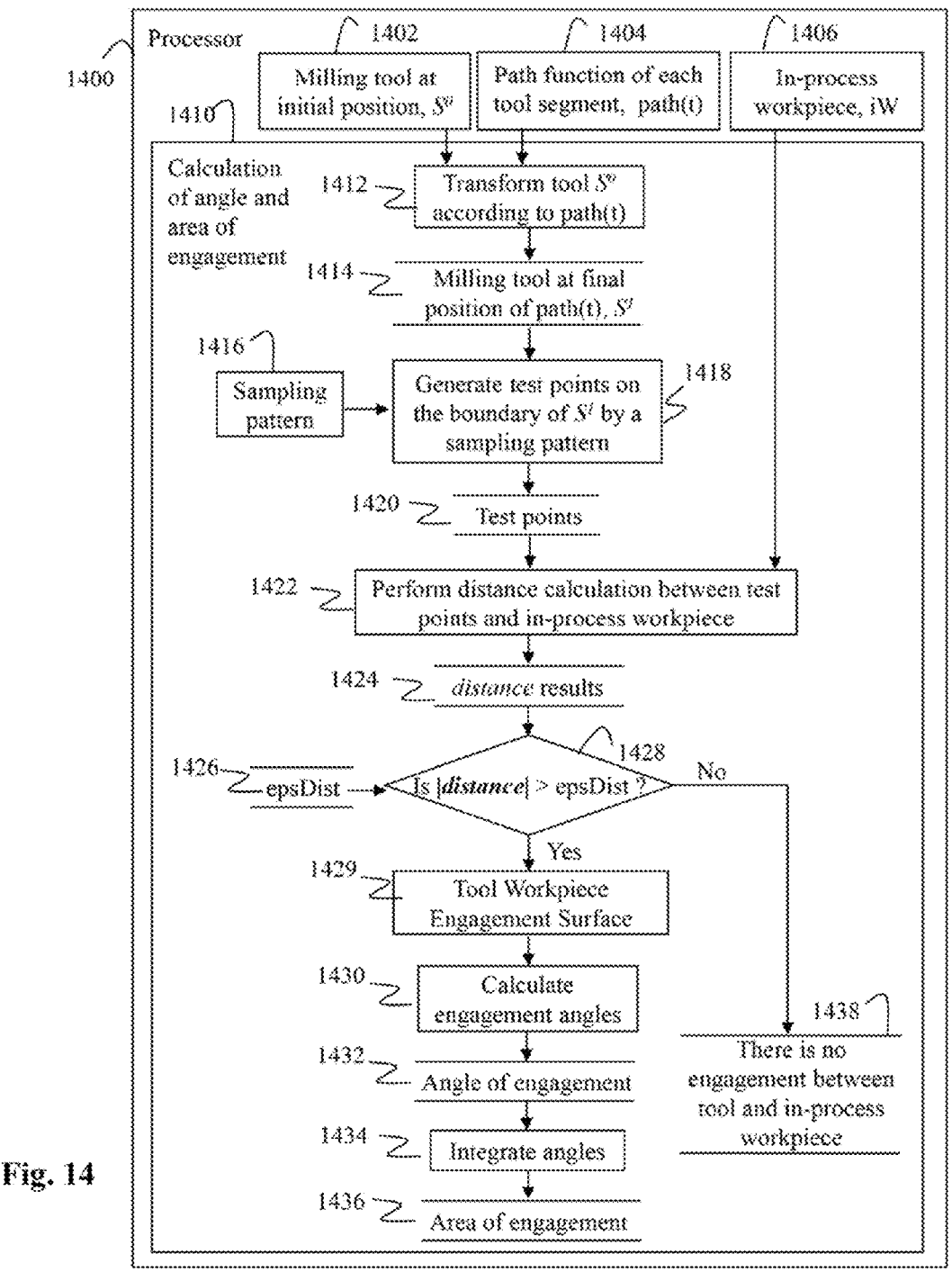
FIG. 14 is a flow diagram of a method for determining the angle and area of engagement between the in-process workpiece and the tool according to some embodiments of the invention.

FIG. 14 shows a flow diagram of a method for determining the angle of engagement 1432 and the area of engagement 1436 using a processor 1400. Given a tool 1402 and the in-process workpiece 1406 at any instance of simulation, and the corresponding tool path segment 1404, the angle and the area of engagement between the tool and the in-process workpiece at given position is determined, based on the engagement surface 1429 corresponding to the instance of the simulation.

In one embodiment, the tool path segment is parameterized by a single parameter t, which corresponds to time traveled by the tool along the path, and the tool 1402 is transformed 1412 to the end position of tool path segment 1414.

Using a sampling pattern 1416, test points 1420 are determined on the boundary of tool 1418. For each test point. 1420, a corresponding distance from the test point to the in-process workpiece 1406 is calculated 1422. The magnitude of the distance 1424 is compared 1428 to the predetermined maximum distance threshold epsDist 1426. If the absolute value of distance is greater than the maximum distance threshold, then the test point is not on the boundary of in-process workpiece. If there are no test points on the boundary of the in-process workpiece, then there is no engagement between the tool and in-process workpiece 1438.

If the absolute value of distance between the test point and in-process workpiece is less than the maximum distance threshold, then the test point is on the boundary of the in-process workpiece. The engagement angle 1430 and area 1434 are determined based on the distances of test points to the composite ADF. After all the test points have been processed, the angles of engagement 1432 are determined. Next, the angles of engagement are integrated to calculate the area of engagement 1436.

Various embodiments of the invention use different sampling pattern 1416. In one embodiment, the sampling pattern, for example, is a set of regularly spaced points in a cylindrical coordinate system, wherein points are equally spaced in angle within equally space planes perpendicular to the tool axis. Alternately, the points can be described in a spherical coordinate system in which the points are equally spaced in azimuth angle within planes that are equally spaced in elevation angle.

In some embodiments, the engagement surface represents the geometric information necessary for milling force prediction in NC milling. Therefore, the accuracy of the prediction of the force depends on the accuracy of the angle of engagement determined based on the accuracy and the density of the sampling pattern. For example, when the depth of the tool along the tool path decreases, the contribution of the region close to the tool tip become more important than the case where the depth increases.

Figure 15A:
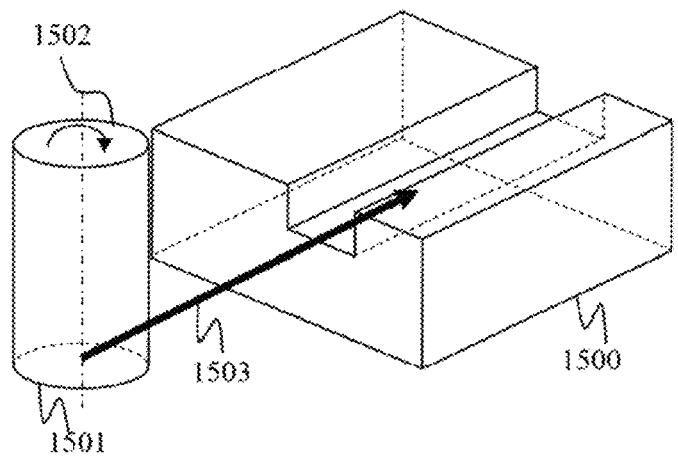
FIG. 15A is a diagram of initial workpiece and a flat-end mill tool according to some embodiments of the invention.

FIG. 15A shows an embodiment simulating the flat-end mill tool 1501 rotating in clockwise direction 1502, moving along a straight: tool path 1503, and removing some material from the workpiece 1500.

Figure 15B:
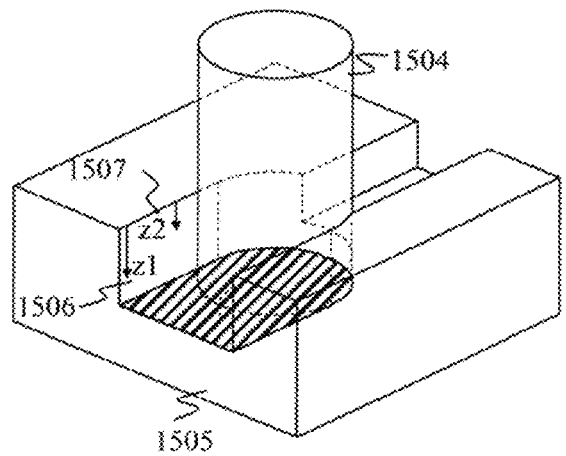
FIG. 15B is a diagram of in-process workpiece and tool instance showing a state of milling performed by the flat-end mill tool according to some embodiments of the invention.
Figure 15C:
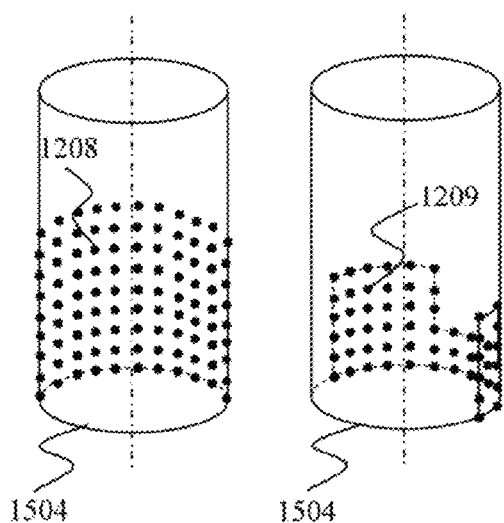
FIG. 15C is a diagram of tool instance and points corresponding to the engagement surface according to some embodiments of the invention.

FIG. 15B shows the in-process workpiece 1505 and the current instance of the tool 1504. Since the front face of the tool is in contact with the in-process workpiece, the set of points 1508 are arranged only on the front face part of the tool 1504, as shown in FIG. 15C. After determination of a distance between each point in the set of points 1508 and a surface of the workpiece 1505 modified by the motion of the tool, a subset of points 1509 are determined to form the engagement surface.

Figure 15D:
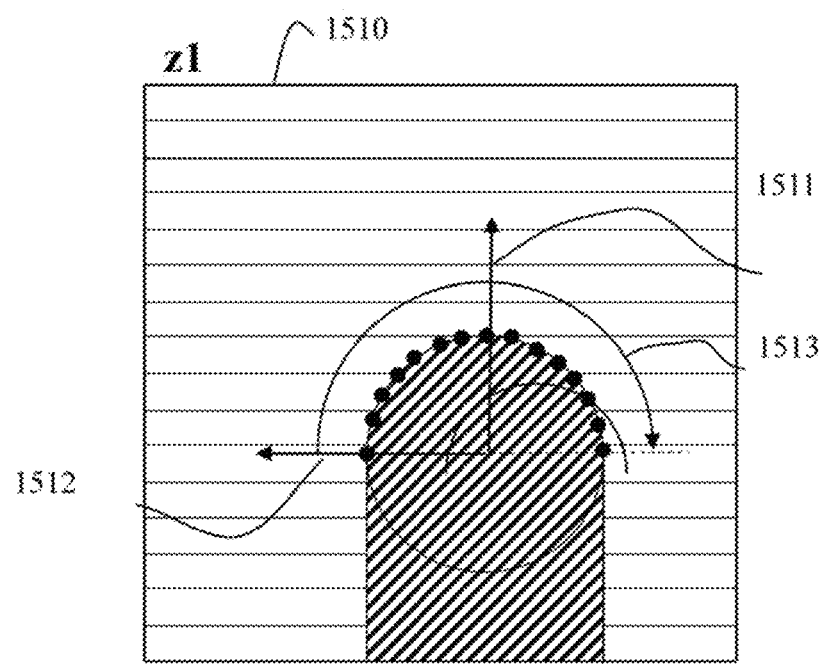
FIGS. 15D and 15E are cross sections of an in-process workpiece according to some embodiments of the invention.
Figure 15E:
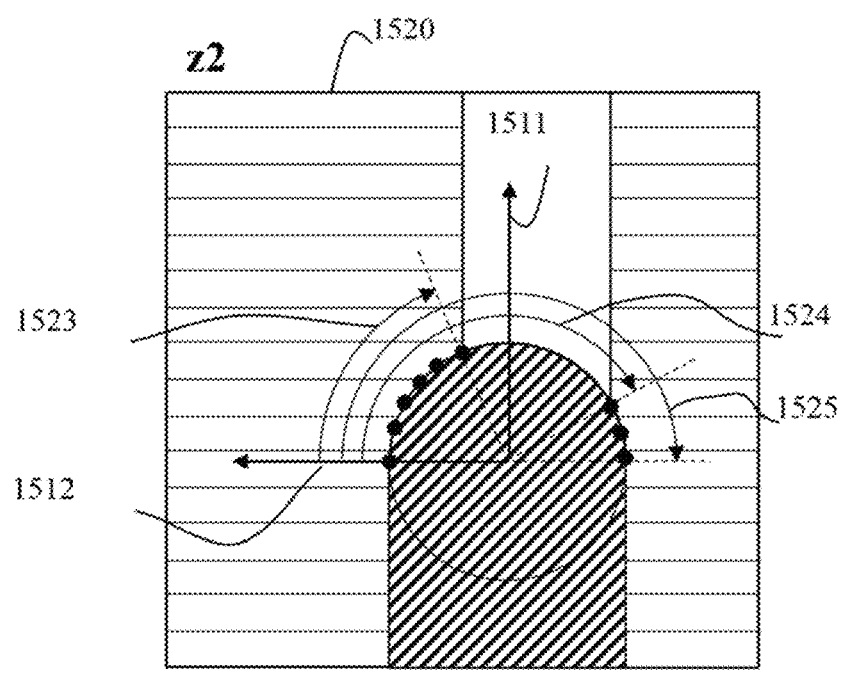

Some embodiments determine an area and an angle of the engagement between the tool and the workpiece based on the engagement surface. For example, one embodiment determines the angle of engagement by using an arctangent function of a tangent tool path vector 1511 and a normal vector 1512. The entry and exit angles of engagement are defined in clockwise direction and measured from the normal vector and where the entry angle is the angle at which the tool begins cutting the workpiece and the exit angle is the angle at which the tool stops cutting the workpiece. For given depths 1506 and 1507, the cross sections 1510 and 1520 of the in-process workpiece are respectively shown in FIGS. 15D and 15E. The entry angle, exit angle and angle of engagement 1513 are 0, 180 and 180 deg. respectively for the cross section 1510 at the depth z1.

During an instant attic simulation, the engagement surface can have one or multiple pairs of entry and exit angles. At the depth z1 1506, the angle of engagement 1513 includes one pair of entry and exit angles, however for the depth z2 1507 and the angle of engagement includes two pairs of entry and exit angles. In the first pair the tool enters the workpiece at 0° and exits at 70° 1523, and in the second pair the tool enters the workpiece at 150° 1524 and exits at 180° 1525. In this example, although the engagement surface is a single surface, different number of pair of entry and exit angles exists for different cross-sections. Also, in various embodiments, the area of the engagement is determined based of a shape of the parts of the engagement surface using appropriate mathematical principles.

Determining Removed Volume

Figure 16:
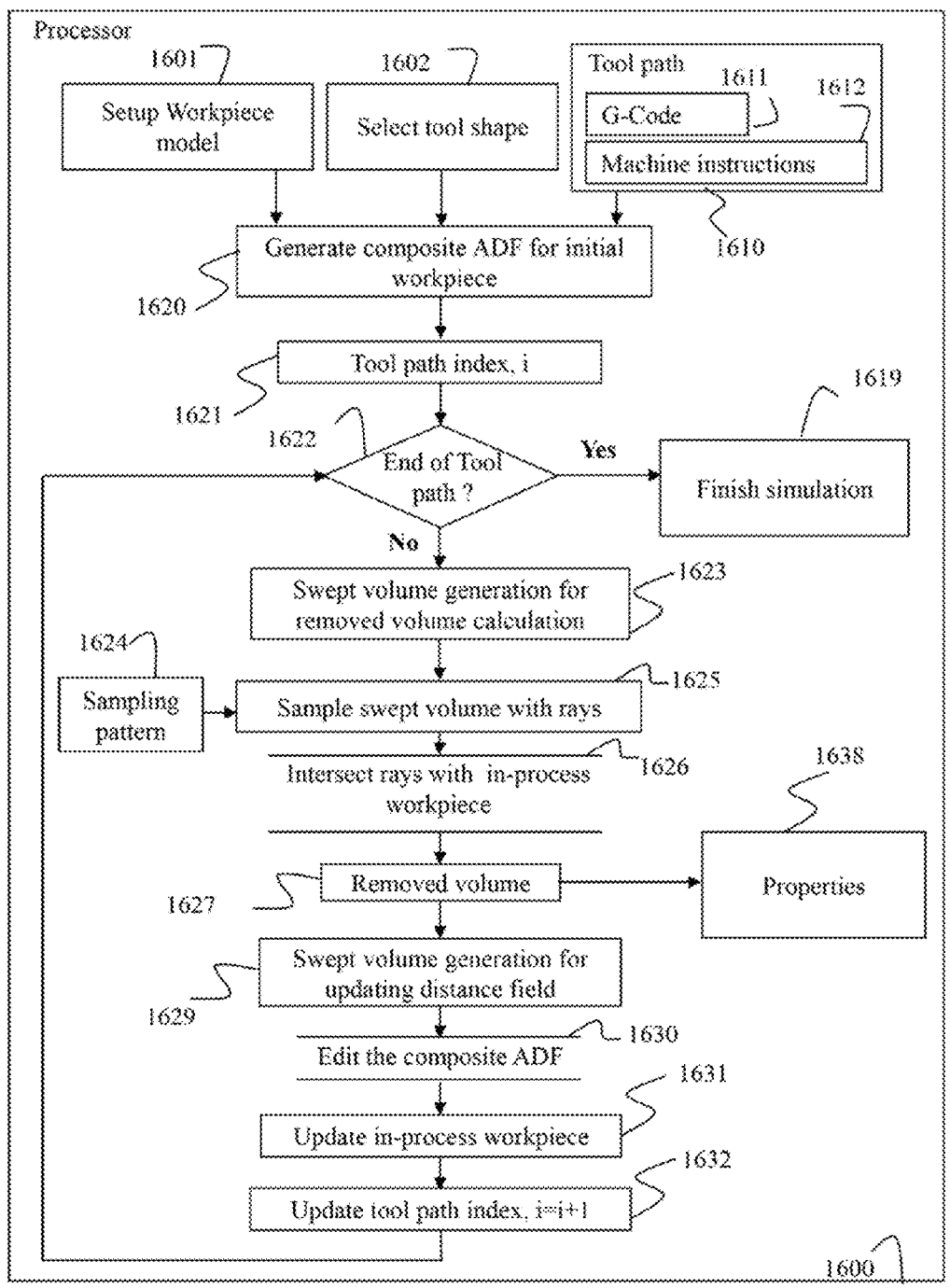
FIG. 16 is a flow diagram of a method for determining a removed volume and its geometric properties according to an embodiment of the invention.

FIG. 16 shows a flow diagram of a method 1600 for determining and analyzing the volume of material removed by the tool moving along a tool path by using the composite ADFs. A model of the workpiece 1601, a shape 1602 of the tool and a tool path 1610 are inputs to the method. The composite ADF is generated 1620 to reconstruct an initial workpiece. The tool path index 1621 is checked 1622 to determine if the current tool instance is the final instance of the tool path to finish 1619 the simulation. Otherwise, using a sampling pattern 1624, a subset of the swept volume 1623 is populated or sampled with rays 1625.

Generation of swept volumes is done by swept volume distance fields in a continuous manner. A current swept volume corresponding to a segment: of the path is sampled 1625 with the set of rays. In one embodiment, the swept volume is modified by taking the Boolean difference of previous tool instance from the swept volume.

The rays intersecting 1626 with the workpiece participate in forming the removed volume 1627. Specifically, the rays are clipped against the workpiece according to the intersection test to determine the internal segments forming the removed volume. The internal segments of the rays have corresponding thickness and length, and can be combined lo approximate the removed volume. In some embodiments, the collection of the internal segments is processed 1628 to determine various properties of the material removed by the particular tool motion, such as its mass, volume, center of mass, width, thickness, length, inertia tensor or a moment of inertia. These properties can be evaluated by determining a boundary of the removed volume.

After the determination of removed volume for each tool path segment, the composite ADF 1620 is edited 1630 with the swept volume distance field 1629 to simulate the milling of the workpiece with the tool motion. During the editing, the initial workpiece 1620 is updated by the swept volume distance field to obtain in-process workpiece 1630.

Figure 17A:
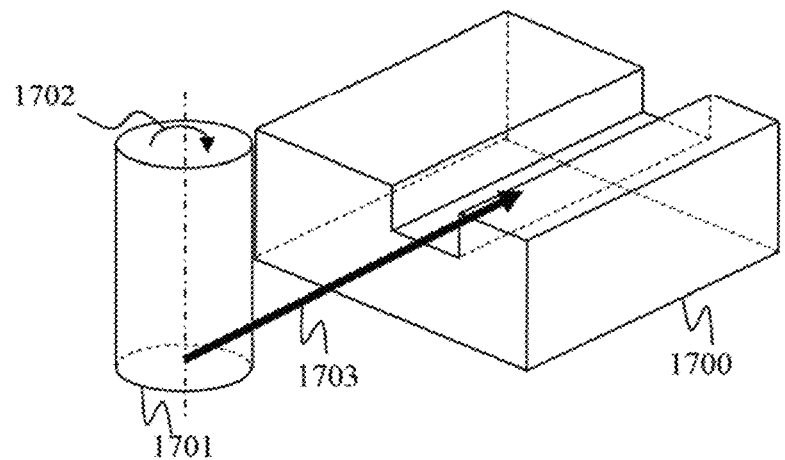
FIG. 17A is a diagram of the workpiece and the flat-end mill tool moving along a tool path according to some embodiments of the invention.

FIG. 17A shows an embodiment simulating the flat-end mill tool 1701 rotating in clockwise direction 1702. The tool 1701 moves along a straight tool path 1703, and removes some material from the workpiece 1700.

Figure 17B:
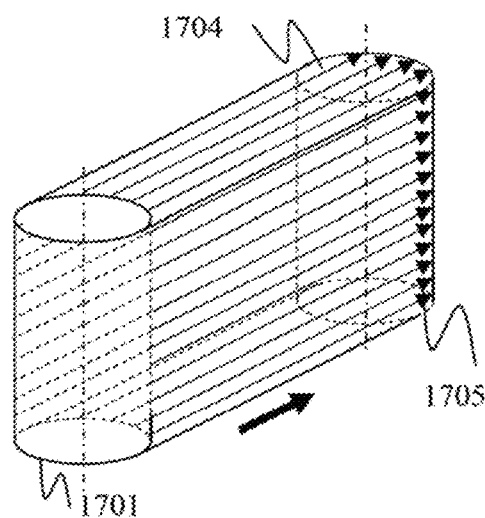
FIG. 17B is a diagram of sampled rays within the swept volume boundary corresponding to tool path segment according to some embodiments of the invention.
Figure 17C:
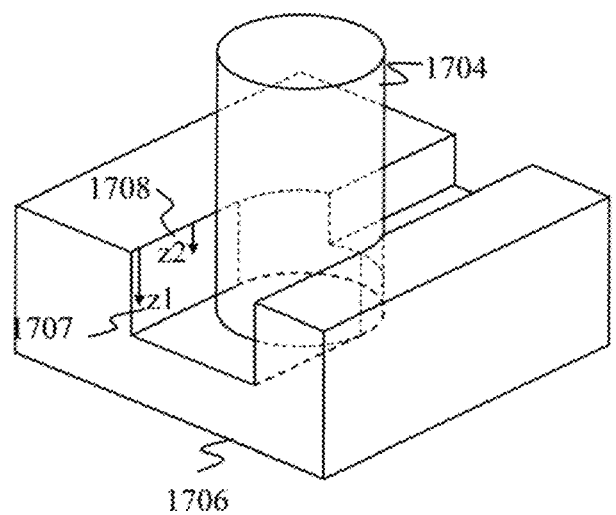
FIG. 17C is a diagram of in-process workpiece and tool instance showing a state of cutting performed by the flat-end mill tool according to some embodiments of the invention.

FIG. 17B shows the swept volume and sampled rays 1705 within this swept volume. FIG. 17C shows the in-process workpiece 1706 and the final instance of the tool 1704. The sampled rays 1705 within the swept volume are intersected and clipped against the in-process workpiece. After determination of the internal segments of the rays that are inside the workpiece according to intersection test, the updated ray segments having certain thickness and height a summed to comprise the removed volume.

Figure 17D:
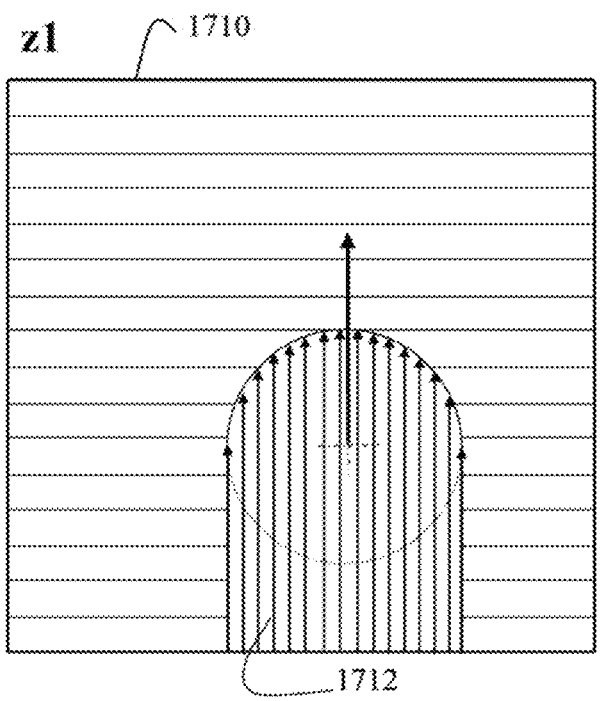
FIG. 17D is the top view of cross section-z1 corresponding to FIG. 17C.
Figure 17E:
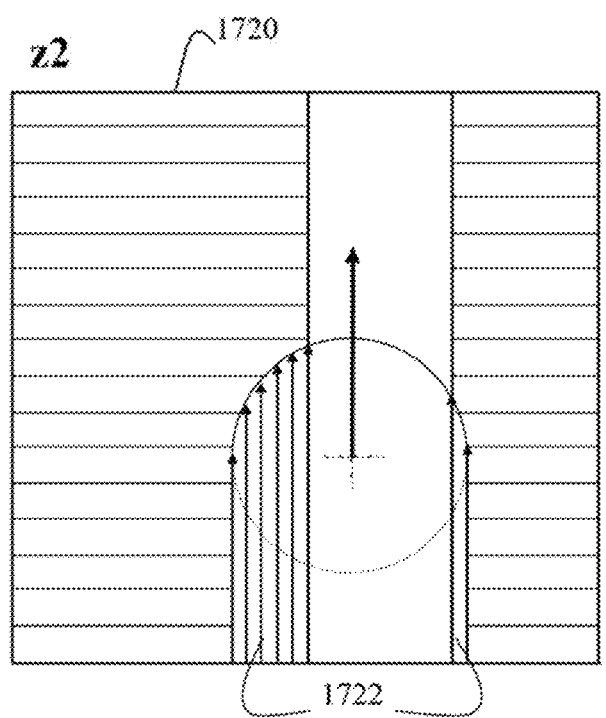
FIG. 17E is the top view of cross section-z2 corresponding to FIG. 17C.

For given depth of depth values 1707 and 1708 of the milling, the cross sections 1710 and 1720 of the in-process workpiece are shown respectively in FIGS. 17D and 17E. The internal segments 1712 and 1722 corresponding to the slices of the removed volume are shown for the given depth of cut values. Although the removed volume for this tool and workpiece is one piece, the removed volume slice 1722 has disconnected pieces.

Operating Environment

Various embodiments of the invention can be operated by numerous general purpose or special purpose computing system environments or configurations. Examples of well-known computing systems, environments, and/or configurations that are suitable for use with the invention include, but are not limited to, personal computers, server computers, handheld or laptop devices, multiprocessor or multi-core systems, graphics processing units (GPUs), application-specific integrated circuits (ASICs), field programmable gate arrays (FPGAs), microcontroller-based systems, network PCs, mainframe computers, distributed computing environments that include any of the above systems or devices, and the like, i.e., generally processors.

For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format. A monitor or other type of display device 160 is connected to any of the above systems to enable visualization 162 of the invention.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining a path of a tool machining a pocket shape in a workpiece, wherein the pocket shape is a closed curve in an x-y plane, comprising:

determining positions and velocities of a motion of an oscillator having an energy defined by a function that is positive within a boundary of the pocket shape and equals zero on the boundary of the pocket shape;

determining coordinates of the path of the tool based on corresponding pairs of position and velocity values of the motion, wherein a position value of each pair represents an x coordinate of the path of the tool in the x-y plane, and a velocity value of each pair represents a y coordinate of the path of the tool in the x-y plane;
determining an equation describing the motion of the oscillator, wherein the equation includes a damping term;
solving the equation with respect to time to determine a set of position and velocity values of the motion of the oscillator for a corresponding set of time instants; and
determining coordinates of the path of the tool at each time instants based on corresponding position and velocity values of the motion;
updating the damping term;
updating the path of the tool by resolving the equation with the updated damping term;
comparing a metric of a performance of the machining with a threshold; and
repeating the updating the damping term and the path of the tool based on a result of the comparing, wherein steps of the method are performed by a processor.

2. The method of claim 1, wherein the positions and the velocities of the motion of the oscillator are determined as a function of time, further comprising:
determining the coordinates as the function of time based on times of the corresponding pairs of position and velocity values.

3. The method of claim 1, further comprising:
selecting an initial engagement point between the tool and a workpiece as a starting point of the motion of the oscillator.

4. The method of claim 1, further comprising:
determining a metric of a performance of the machining with a threshold; and
repeating the updating of the damping term and the path of the tool if the metric does not satisfy a constraint.

5. The method of claim 4, wherein the constraint is one or combination of a degree of a curvature, a length of the path, an angle of engagement of the tool, an amount of a removed volume, and a cutting force of the tool.

6. The method of claim 1, further comprising:
determining an Rvachev (R)-function as the function of the energy of the oscillator;
determining an equation describing the motion of the oscillator using the R-function, wherein the equation includes a damping term;
solving the equation with different values of the damping term to produce a set of paths of the tool; and
selecting the path of the tool from the set corresponding to an optimal metric of performance.

7. The method of claim 6, further comprising:
simulating the machining by the motion of the tool according to each path from the set of paths to produce a set of simulations; and
determining a metric of performance of each simulation from the set of simulations to produce a set of metrics; and
selecting an optimal metric of performance from the set of metrics according to a cost function.

8. The method of claim 7, wherein the metric of performance includes an engagement surface of the tool moving along the path or a volume removed by the motion of the tool.

9. The method of claim 8, wherein the metric of performance includes the engagement surface, comprising:
arranging a set of points on at least a part of a surface of the tool;
determining a distance between each point in the set of points and a surface of the workpiece modified by the motion; and
determining the engagement surface based on a subset of the points having the distance less than a threshold.

10. The method of claim 8, wherein the metric of performance includes the volume removed by the motion of the tool, comprising:
generating a swept volume for a segment of the path of the tool, the segment defines the motion of the tool from a previous position to a next position of the tool during the simulation;
casting rays through the swept volume to represent a motion of the tool in relation to the workpiece;
determining a portion of volume removed from the workpiece by the swept volume based on intersections of at least some rays with the workpiece; and
repeating the generating, the casting and the determining the portion of the volume steps for all segments of the path to produce the volume removed by the motion of the tool.

11. A system for determining for determining a path of a tool machining a pocket shape given by a closed curve on an x-y plane, comprising:
a processor for determining positions and velocities of a motion of an oscillator having an energy defined by a function that is positive within a boundary of the pocket shape and equals zero on the boundary of the pocket shape and for determining coordinates of the path of the tool based on corresponding pairs of position and velocity values of the motion, wherein a position value of each pair represents an x coordinate of the path of the tool on the x-y plane, and a velocity value of each pair represents a y coordinate of the path of the tool on the x-y plane,
wherein the processor determines an equation describing the motion of the oscillator, wherein the equation includes a damping term, and the processor solves the equation with respect to time to determine a set of position and velocity values of the motion of the oscillator for a corresponding set of time instants, determines coordinates of the path of the tool at each time instants based on corresponding position and velocity values of the motion, updates the damping term, updates the path of the tool by resolving the equation with the updated damping term, compares a metric of a performance of the machining with a threshold, and repeats the updating the damping term and the path of the tool based on a result of the comparing.

12. The system of claim 11, further comprising:
a simulation system for simulating the machining of a workpiece according to the path to determine a metric of performance of the path.

13. A non-transitory computer readable recording medium for determining a path of a tool machining a pocket shape in a workpiece, having stored thereon, instructions that when executed by a processor, cause the processor comprising steps of:
determining positions and velocities of a motion of an oscillator having an energy defined by a function that is positive within a boundary of the pocket shape and equals zero on the boundary of the pocket shape, wherein the pocket shape is a closed curve in an x-y plane;
determining coordinates of the path of the tool based on corresponding pairs of position and velocity values of the motion, wherein a position value of each pair represents an x coordinate of the path of the tool in the x-y plane, and a velocity value of each pair represents a y coordinate of the path of the tool in the x-y plane;

determining an equation describing the motion of the oscillator, wherein the equation includes a damping term;

solving the equation with respect to time to determine a set of position and velocity values of the motion of the oscillator for a corresponding set of time instants; and determining coordinates of the path of the tool at each time instants based on corresponding position and velocity values of the motion;

updating the damping term;

updating the path of the tool by resolving the equation with the updated damping term;

comparing a metric of a performance of the machining with a threshold; and repeating the updating the damping term and the path of the tool based on a result of the comparing.

* * * * *